United States Patent [19]
Orimo et al.

[11] Patent Number: 5,666,484
[45] Date of Patent: Sep. 9, 1997

[54] CONTROL METHOD FOR DISTRIBUTED PROCESSING SYSTEM

[75] Inventors: Masayuki Orimo, Kawasaki; Kinji Mori, Yokohama; Yasuo Suzuki, Ebina; Katsumi Kawano, Kawasaki; Masuyuki Takeuchi, Fujisawa; Masayoshi Matsuura, Hitachi; Yuko Teranishi, Koganei, all of Japan

[73] Assignee: Hitachi, Ltd., Tokyo, Japan

[21] Appl. No.: 406,234

[22] Filed: Sep. 12, 1989

[30]     Foreign Application Priority Data

Sep. 14, 1988 [JP] Japan ................... 63-228667
Sep. 14, 1988 [JP] Japan ................... 63-228685

[51] Int. Cl.⁶ .................................................. G06F 11/34
[52] U.S. Cl. ........................................ 395/182.16; 371/32
[58] Field of Search ............................. 371/16.5, 29.1, 371/32, 20.6; 364/264.6 MS File, 229.2 MS File, 239.6 MS File, 230 MS File, 230.1 MS File, 230.2 MS File, 230.3 MS File, 230.4 MS File, 230.5 MS File, 230.6 MS File; 370/61; 395/200, 275 MS File, 575, 182.16

[56]            References Cited
           U.S. PATENT DOCUMENTS

| | | | |
|---|---|---|---|
| 4,096,571 | 6/1978 | Vander Mey | 364/200 |
| 4,410,938 | 10/1983 | Higashiyama | 371/19 |
| 4,486,829 | 12/1984 | Mion et al. | 364/200 |
| 4,494,188 | 1/1985 | Nakane et al. | 364/200 |
| 4,547,850 | 10/1985 | Genma | 364/200 |
| 4,583,224 | 4/1986 | Ishii et al. | 371/29.1 |
| 4,592,053 | 5/1986 | Matsuura | 371/16.1 |
| 4,618,754 | 10/1986 | Otobe et al. | 371/16.5 |
| 4,740,910 | 4/1988 | Sakata et al. | 364/900 |
| 4,773,070 | 9/1988 | Schumm et al. | 371/68.2 |
| 4,779,224 | 10/1988 | Takahashi et al. | 371/32 |
| 4,802,167 | 1/1989 | Sawaya et al. | 371/29.1 |
| 4,807,118 | 2/1989 | Lin et al. | 364/200 |
| 4,821,267 | 4/1989 | Druegh et al. | 371/29.1 |
| 4,947,393 | 8/1990 | Paul et al. | 371/16.5 |

OTHER PUBLICATIONS

"The structure of system 188, a fault–tolerant computer" Harrison et al. IBM Systems Journal vol. 26 Nov. 3, 1987.
"Fault tolerance mechanisms in real time distributed operating systems: an overview" Kim et al. 1986.
"Computer networks" by Andrew S. Tanenbaum, IEEE Standard 802 for local area networks, 1988, pp. 157–312.
H. Rudin et al., "A Validation Technique for Tightly Coupled Protocols", *IEEE Transactions on Computers*, vol. C–31, No. 7, Jul. 1982, pp. 630–636.
A. Hopper et al., *Local Area Network Design*, Addison–Wesley, 1986, pp. 10–13, 94–103, and 155–163.

*Primary Examiner*—Phung Chung
*Attorney, Agent, or Firm*—Antonelli, Terry, Stout & Kraus, LLP

[57]            ABSTRACT

A distributed processor system includes a plurality of processors connected via a transmission medium. A control method for a distributed processor system includes the steps of judging, in each processor, its own receiving capability and performing abnormality processing on the basis of the result of the judgment.

26 Claims, 23 Drawing Sheets

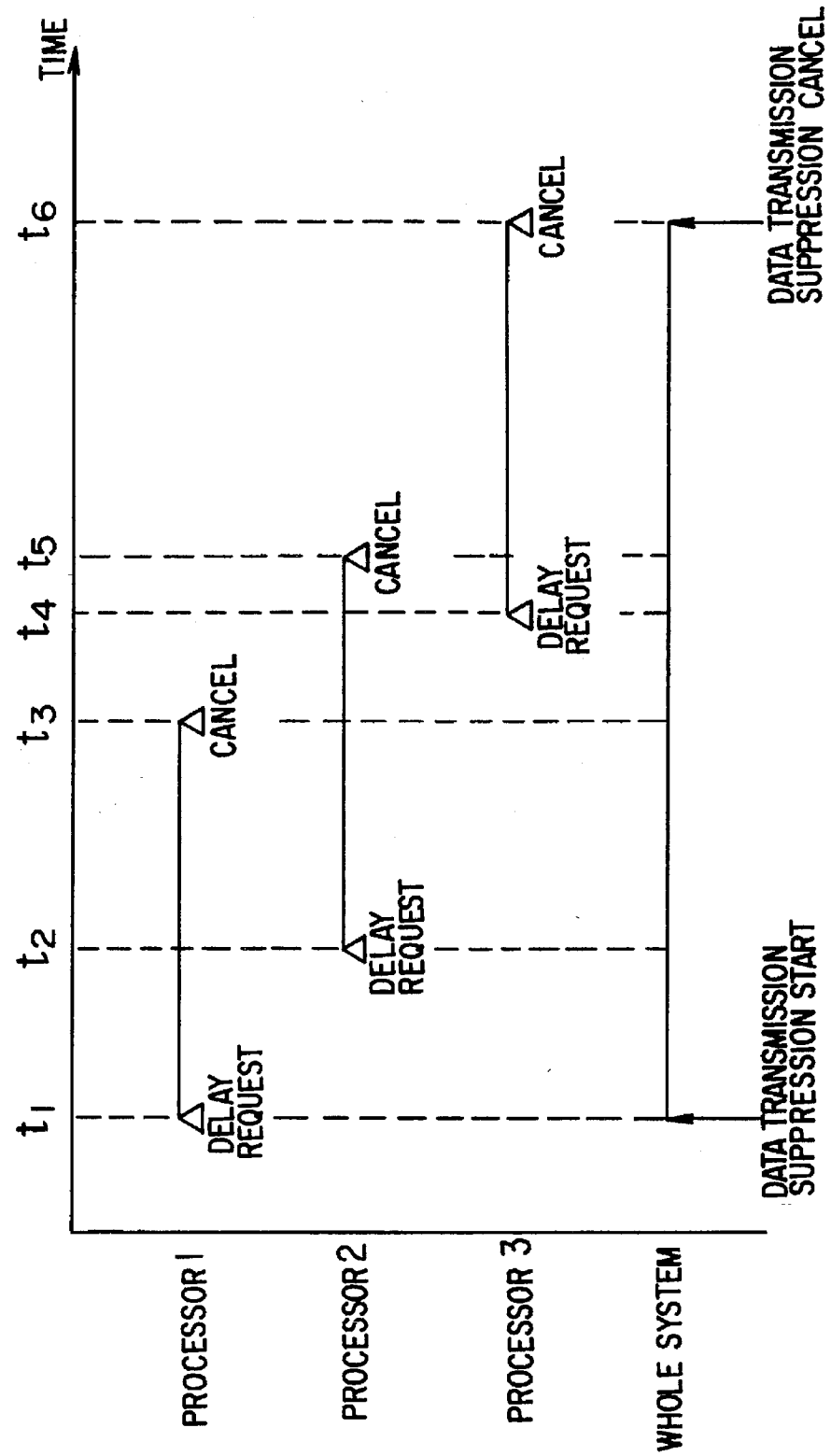

F I G. 12A
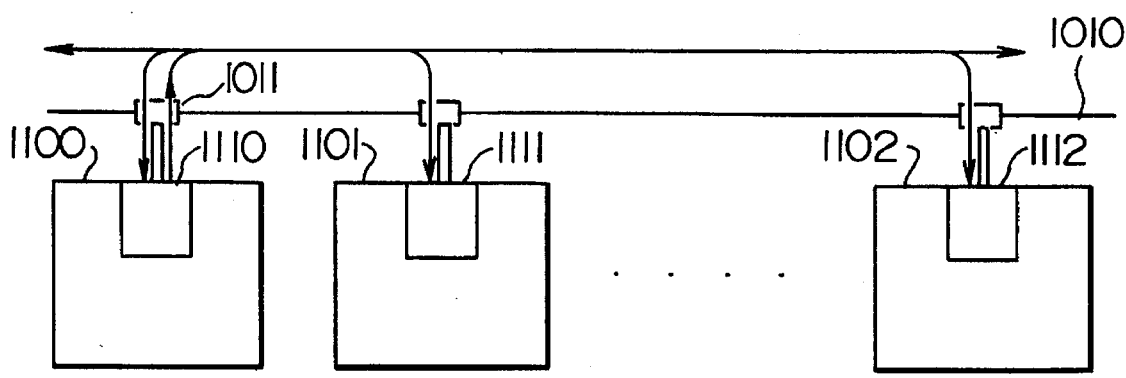
F I G. 12C
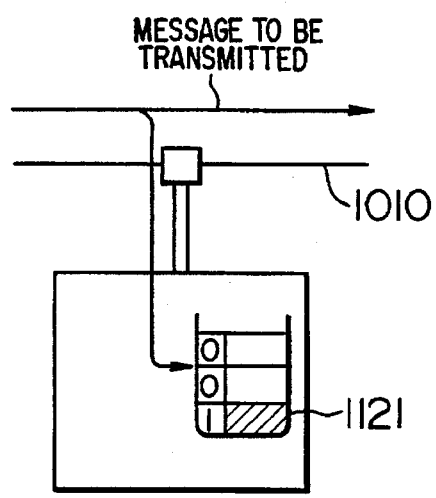
F I G. 12D
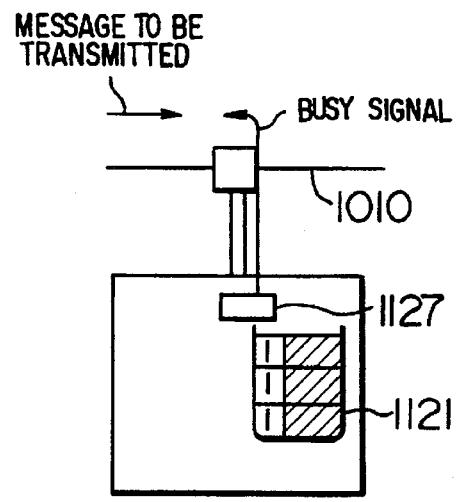

F I G. 20
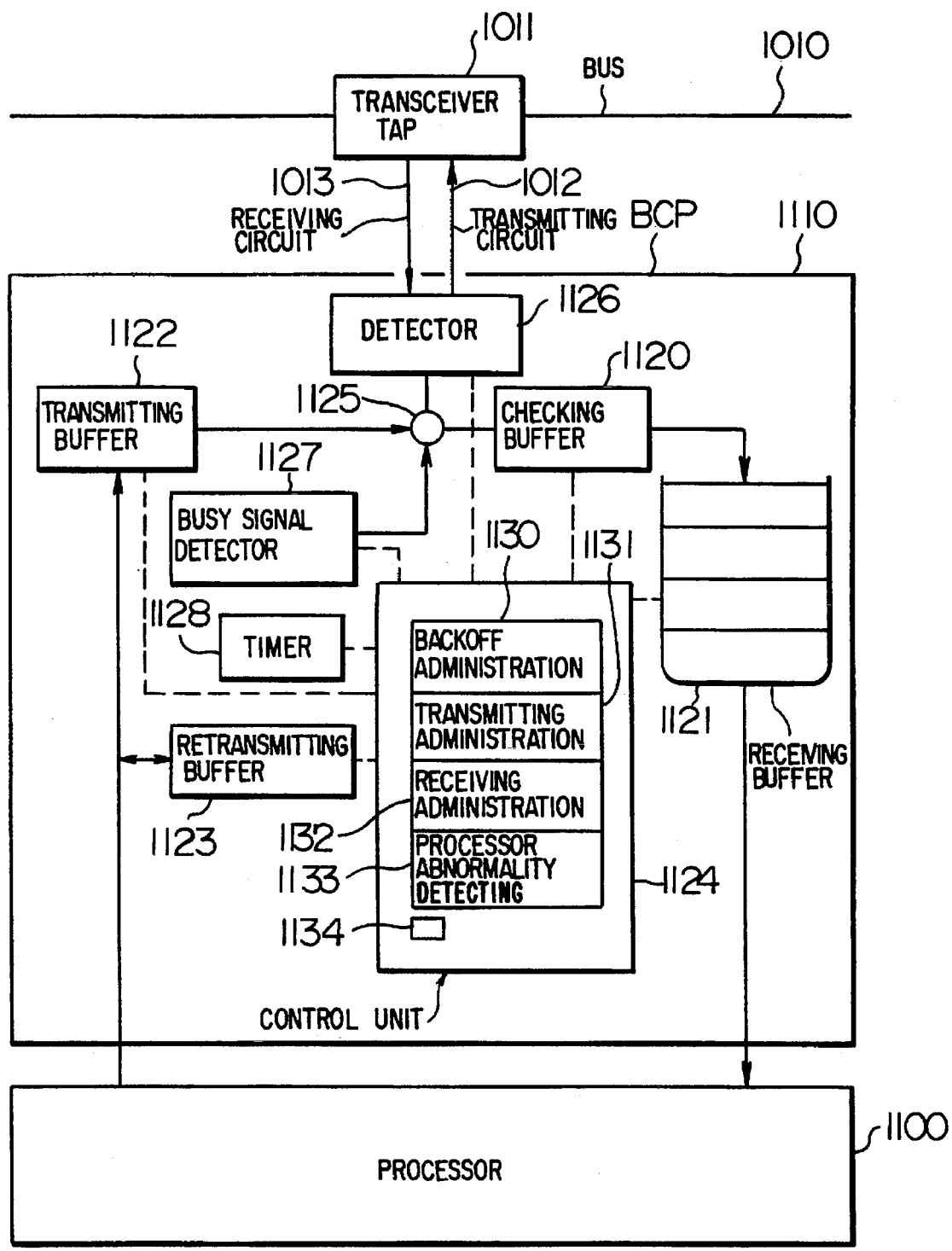

F I G. 21A
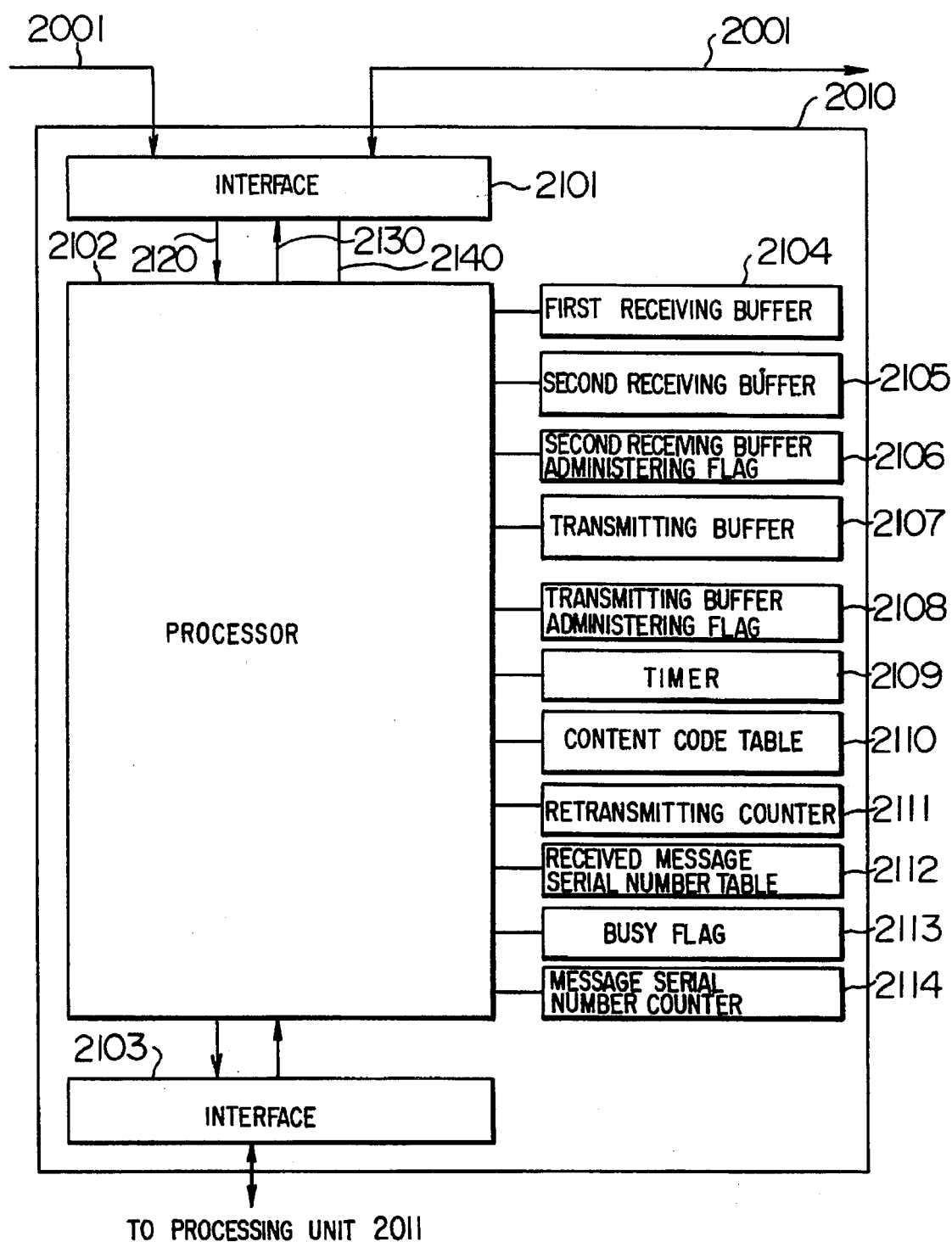

CONTROL METHOD FOR DISTRIBUTED PROCESSING SYSTEM

BACKGROUND OF THE INVENTION

The present invention relates to a control method for a multiprocessor system.

As for conventional data transmission and reception control methods for multiprocessor systems, a command/response scheme is used in a high level data link control (HDLC) procedure or the like as described in "Information Processing", Information Processing Society of Japan, Vol. 23, No. 12, 1982, pp. 1154 to 1160. This scheme is one-to-one communication wherein a processor for transmitting data specifies a processor which should receive the data, and the processor which has received the data transmits a response indicating success in the reception on the data to the processor which has transmitted the data. The processor on the transmission side detects success in the data transmission upon receiving the response, whereas the processor on the transmission side detects failure in the data transmission on the basis of the fact that the response is not returned. This scheme is based on the assumption that the processor on the transmission side knows the address of the processor on the reception side.

Further, there is also a broadcast system in which data is transmitted without specifying a specific receiving processor, and all processors within the system receive the data. In this system, the response confirming the reception of data from the receiving processor is not transmitted. Even if a fault occurs in a processor within the system or a processor is newly added, therefore, the processor on the transmission side can transmit data without being conscious of such a fact.

In the one-to-one communication which is the above described related art, data omission at the data transmission level is not caused because a response is returned for every transmission. Since the one-to-one communication is based on the assumption that the processor on the transmission side knows the addresses of all processor on the receiving side, however, it is necessary to inform all processors of a change in system configuration caused by expansion, a fault or the like, resulting in a problem in expandability. In broadcast communication, such a need is obviated and expandability is high. Since a response is not returned, however, there is possibility that data loss is caused when an increased load causes overflow of a receiving buffer and broadcasted data cannot be received, for example.

SUMMARY OF THE INVENTION

An object of the present invention is to provide a control method for a distributed processor system, which improves the reliability, expandability and maintenance efficiency of the system by providing a highly reliable broadcast communication system free from data loss.

In accordance with a feature of the present invention, each processor monitors its own load in broadcast communication and informs other processors of the state if necessary, the above described object being thus achieved.

In accordance with another feature of the present invention the number of data items contained in a buffer for storing therein received data is monitored as means for monitoring the load.

In accordance with the present invention, a processor having a data receiving capability which is lowered by an increase in load informs other processors of the lowering in capability, and other processors temporarily stop the data transmission. As a result, processing in the first processor is promoted and the load is decreased, resulting in a raised data receiving capability. This obviates omission of reception of broadcasted data, and continuity of data can be maintained.

BRIEF DESCRIPTION OF THE DRAWINGS

FIG. 11 is a diagram for explaining effects of a fourth embodiment.

FIG. 12A is a block diagram showing an entire system configuration of a fifth embodiment of the present invention.

FIGS. 12C and 12D are diagram for explaining receiving processing and busy signal sending.

FIG. 20 is a block diagram showing detailed configuration of a BCP in a seventh embodiment.

FIGS. 21A and 21B are diagrams showing internal configuration of an NCP.

DESCRIPTION OF THE PREFERRED EMBODIMENTS

Figure 1A:
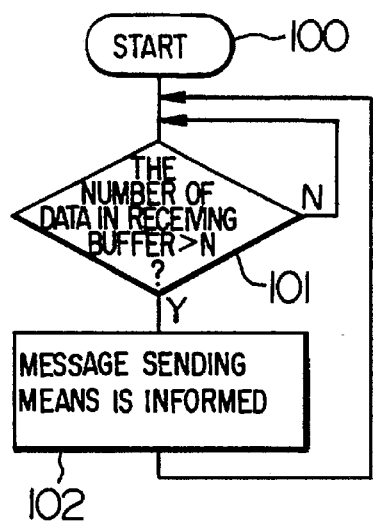
FIGS. 1A, 1B and 1C are operation flow charts of a first embodiment of the present invention.
Figure 1B:
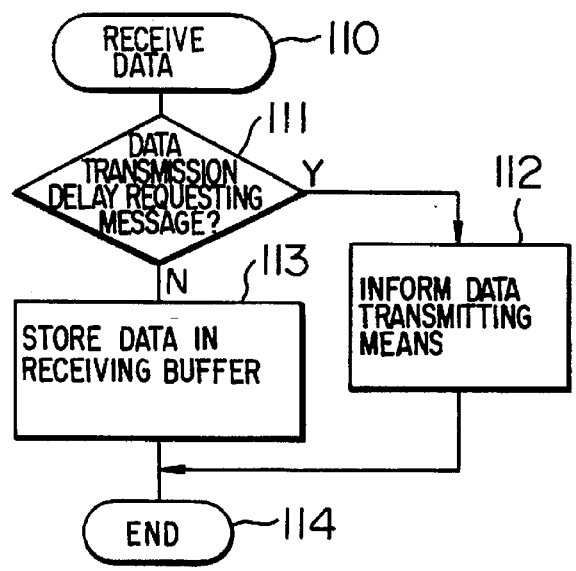
Figure 1C:
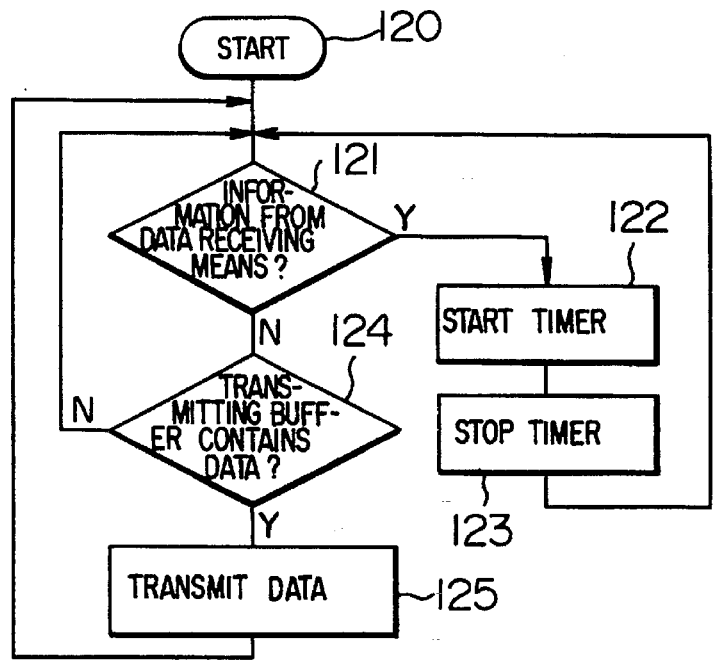
Figure 2A:
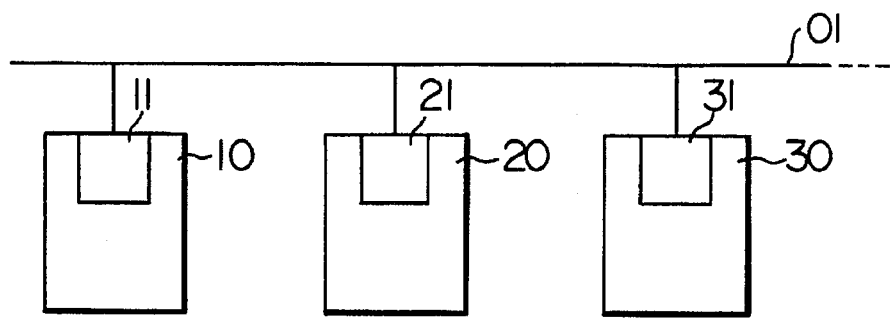
FIGS. 2A and 2B are system configuration diagrams.
Figure 2B:
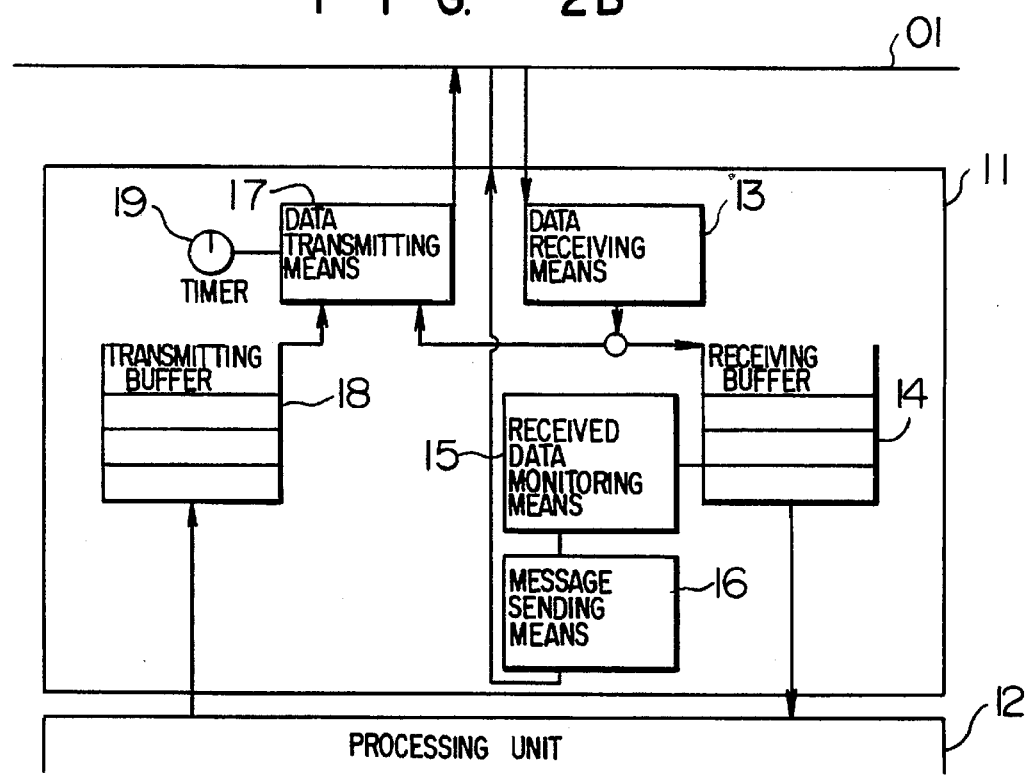
Figure 3:
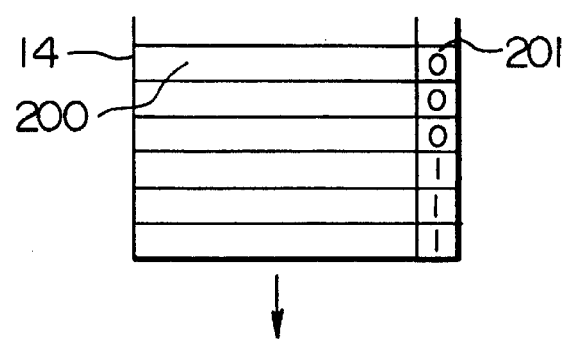
FIG. 3 is a configuration diagram of a receiving buffer.
Figure 4:
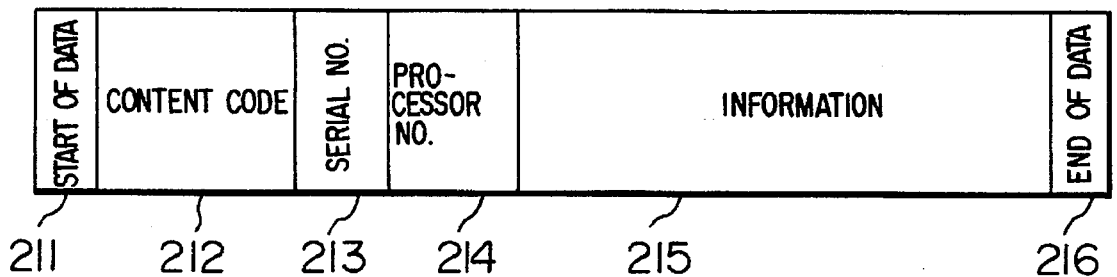
FIG. 4 is a format diagram of transmission data.

A first embodiment of the present invention will now be described by referring to the drawings. FIG. 2A is a diagram of the entire system. Processors 10, 20 and 30 are connected together via a transmission path 01. The processors 10, 20 and 30 have interfaces 11, 21 and 31 with respect to the transmission path 01, respectively. Although three processors 10, 20 and 30 are illustrated, any number of processors may be connected via the transmission path 01 so long as the number is two or more. In this case, operation of each processor does not change. FIG. 2B shows the structure of the interface 11 of the processor 10 with respect to the transmission path 01. Other processors also have the same structure as that of the processor 10. The interface 11 comprises data receiving means 13 for receiving data from the transmission path 01, a receiving buffer 14 for storing therein the received data, received data monitoring means 15 for monitoring the number of data items stored in the receiving buffer 14, message sending means 16 for transmitting a data transmission delay requesting message to the transmission path 01, data transmitting means 17 for transmitting data to the transmission path 01, a transmitting buffer 18 for storing therein data to be transmitted, and a timer 19. These respective means can be implemented by using a common processor or individual processors. A processing unit 12 acquires data from the receiving buffer 14, performs processing upon the data, and stores data to be transmitted into the transmitting buffer 18. FIG. 3 shows the configuration of the receiving buffer 14. The receiving buffer comprises a plurality of data storing areas. Each area comprises a data section 200 and a flag section 201. The flag 201 is "1" when that area has data stored therein, whereas the flag 201 is "0" when that area has no data stored therein. The data receiving means 13 stores data in the lowest area in the figure having no data stored therein, i.e., having a flag "0". If the flag of the lowest area is "1", the processing unit 12 takes the data of that lowest area in and moves data of areas located above that area downward one by one. The receiving data monitoring means monitors the receiving state by counting areas each having a logic "1" in flag 201. FIG. 1A is an operation flow chart of the operation of the received data monitoring means 15. The number of data stored in the receiving buffer is monitored (step 101). When the number is not less than a predetermined value N, the message sending means is informed about it (step 102). Immediately upon receiving the information from the received data monitoring means 15, the message sending means 16 transmits a data transmission delay requesting message to the transmission path 01. FIG. 1B is an operation flow chart of the data receiving means 13. The data receiving means 13 receives data (step 110). If the data is a data transmission delay requesting message (step 111), the data receiving means 13 informs the data transmitting means 17 (step 112) of that fact. Otherwise, the data receiving means puts data in the receiving buffer 14 (step 113) and finishes the processing (step 114). FIG. 1C is an operation flow chart of the operation of the data transmitting means 17. When the data receiving means 13 has informed the data transmitting means 17 of reception of the data transmission delay requesting message (step 121), the data transmitting means 17 starts the timer (step 122). When the timer stops (step 123), the operation returns to its original state. If the data transmitting means 17 does not receive a delay request and the transmitting buffer contains data (step 124), the data transmitting means 17 transmits data (step 125) and returns to the original state. The time length set in the timer has a constant value or alternatively has a variable value depending upon how frequently the data transmission delay requesting message is received. In the latter case, a time T elapsing since previous reception of the same message until its reception at this time is measured, and the value of the timer is so changed as to become smaller when T is large and become larger when T is small. By using this method, it becomes possible to delay the data transmission according to the degree of congestion on the transmission path 01 and the loads of other processors. When data is to be transmitted to the transmission path 01, the broadcast scheme is used. FIG. 4 is a format diagram of data flowing on the transmission path. Numerals 211 and 216 denote symbols representing the start and end of data, respectively. Numeral 212 denotes a content code for representing contents of the data. Numeral 213 denotes a serial No. Numeral 214 denotes the processor No. which transmits data, and numeral 215 denotes information. Data having such a format is broadcast. As a result, all processors on the transmission path 01 receive the data and judge whether the data is necessary data or not on the basis of the content code 212. The processors judge whether the same data was received in the past or not on the basis of the serial No. 213 and discard new data in case of overlap. By the processor No. 214, each of the processors judges whether the received data is data it has generated. If the data transmission delay requesting message also complies with the format of FIG. 4, it is possible to keep the data transmission delay message transmitted by a processor from stopping the transmission of data to be transmitted which has been generated in that processor.

Figure 5:
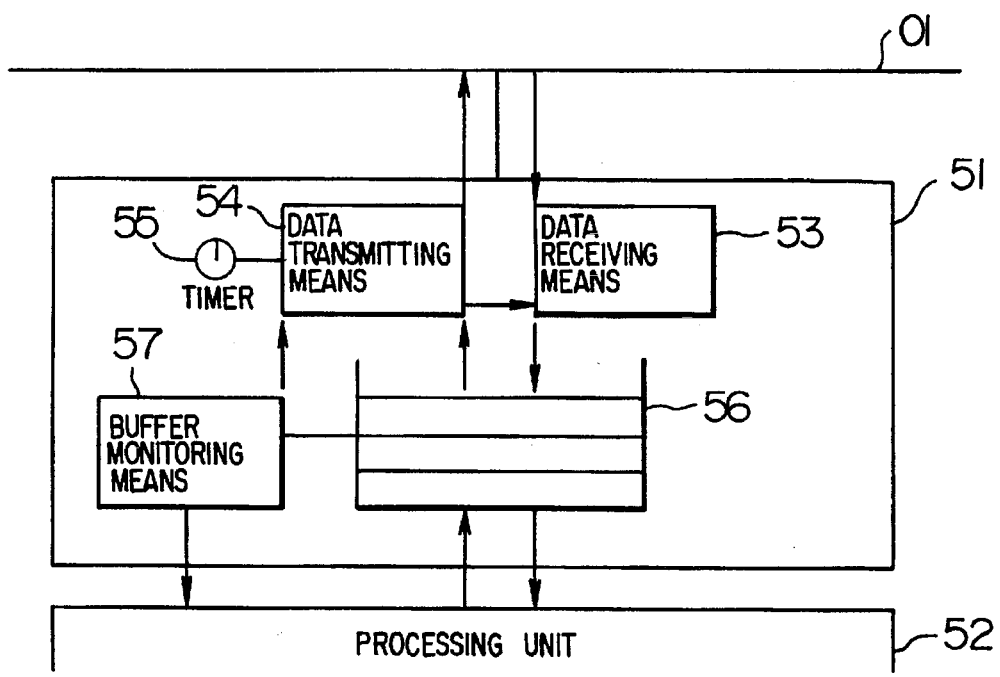
FIG. 5 is a system configuration diagram of a second embodiment of the present invention.
Figure 6:
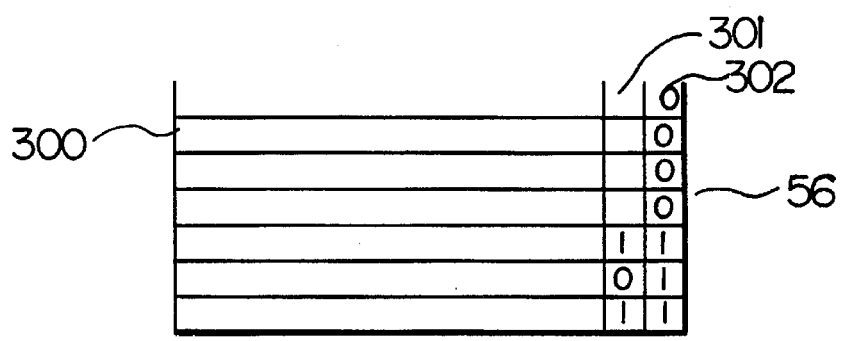
FIG. 6 is a configuration diagram of a transmission and reception buffer.
Figure 7A:
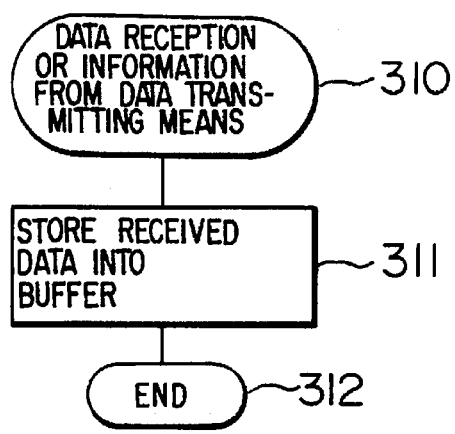
FIGS. 7A, 7B and 7C are operation flow charts.
Figure 7C:
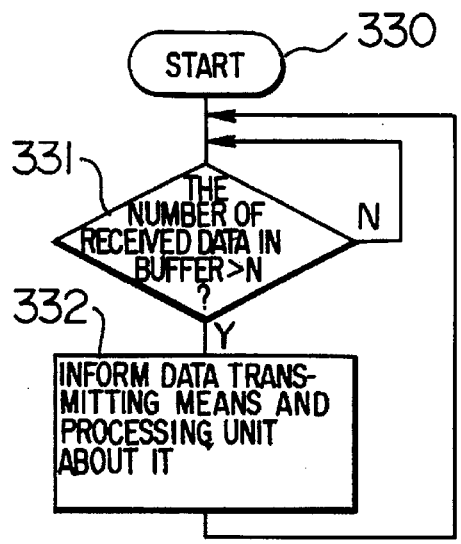
Figure 7B:
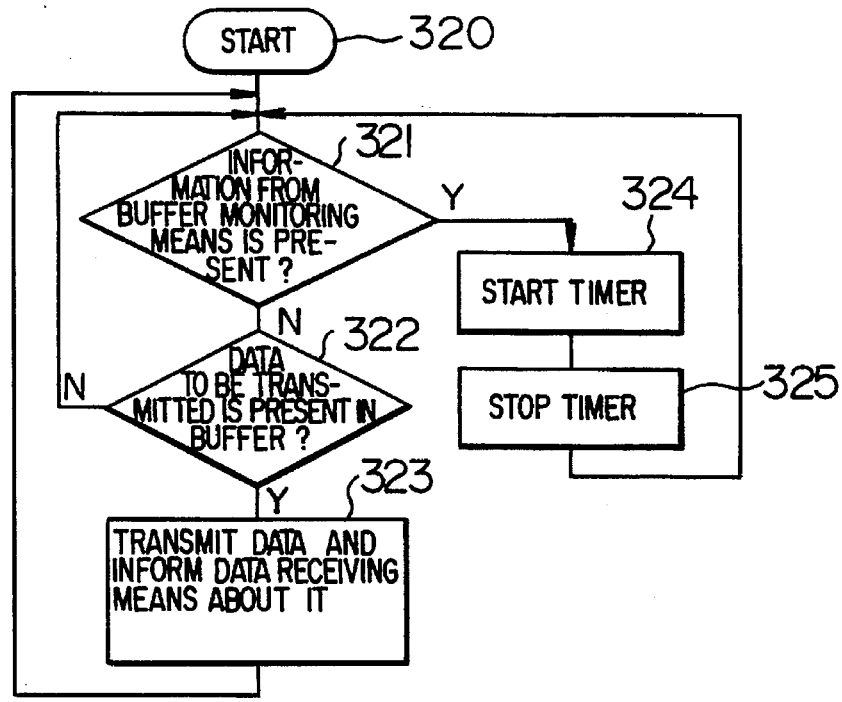

In a second embodiment of the present invention, each processor monitors its own data receiving capability in case the loads of all processors on the transmission path and the capacities of the receiving buffers are equivalent. If its own data receiving capability is lowered, each processor supposes that data receiving capabilities of other processors are similarly lowered and stops its own data transmission temporarily. The second embodiment will hereafter be described by referring to FIG. 5, which is a configuration diagram of an interface section 51 between the transmission path 01 and the processor. The interface 51 comprises data receiving means 53 for receiving data from the transmission path, data transmitting means 54 for transmitting data supplied from a processing unit 52 and for informing the receiving means of the data, a timer 55, a transmitting and receiving buffer 56, and buffer monitoring means 57 for monitoring the number of data items stored in the transmitting and receiving buffer 56. These means can be implemented by a common processor or individual processors. FIG. 6 is a configuration diagram of the transmitting and receiving buffer 56. The transmitting and receiving buffer 56 comprises a data section 300, a transmitting/receiving flag 301 and a data storage flag 302. The transmitting/receiving flag 301 becomes "0" when the data contained in that section is data to be transmitted, and it becomes "1" when the data contained in that section is received data. The data storage flag 302 becomes "1" when that line contains some data, and it becomes "0" when that line contains no data. When the data receiving means 53 stores data into the transmitting and receiving buffer 56, therefore, both flags become "1". The processing unit takes data having "1"s in both flags and changes the storage flag 302 to "0". When the processing unit 52 stores data to be transmitted into the transmitting and receiving buffer 56, the processing unit 52 sets the transmitting/receiving flag 301 at "0" and sets the storage flag 302 at "1". When the data transmitting means 54 performs data transmission, it transmits data having a transmitting/receiving flag 301 set at "0" and a storage flag set at "1" and sets the storage flag at "0". By using such a buffer and an administration method, it becomes possible to suppress data transmission and use a vacant region of the transmitting and receiving buffer 56 exclusively for data when data reception is frequently performed. This is equivalent to a temporary increase in capacity of the receiving buffer, and hence lowering of receiving capability can be suppressed. FIG. 7A is an operation flow chart of the data receiving means 53 in the present embodiment. When the data receiving means 53 receives data or is informed about data by the transmitting means 54 (step 310), the means 53 stores that data into the transmitting and receiving buffer 56 (step 311). FIG. 7B is an operation flow chart of the data transmitting means 54. When the data transmitting means 54 is informed about lowering of data receiving capability by the buffer monitoring means 57 (step 321), the means 54 starts the timer (step 324). When the timer stops (step 325), the data transmitting means 54 returns to its original state. When the information from the buffer monitoring means 57 is not present, the data transmitting means 54 judges whether data to be transmitted is present in the transmitting and receiving buffer 56 or not by seeing the transmitting/receiving flag 301 and the storage flag 302 (step 322). If data to be transmitted is present, the data transmitting means 54 transmits data and informs the data receiving means 53 about it (step 323). The value set into the timer is constant in a method, and it is a variable value depending upon the frequency of information supplied from the buffer monitoring means 57 in another method. FIG. 7C is an operation flow chart of the buffer monitoring means 57. The buffer monitoring means 57 monitors the number of received data stored in the transmitting and receiving buffer by checking the transmitting/receiving flag 301 and the storage flag 302 which are set. If the number of received data exceeds N (step 331), the buffer monitoring means informs the data transmitting means 54 and the processing unit 52 about it (step 332). Upon receiving information from the buffer monitoring means 57, the processing unit temporarily stops storing data to be transmitted into the transmitting and receiving buffer 56. The duration of stoppage is equivalent to or longer than the timer value of the data transmitting means 54. Thereby the processing unit 52 takes in received data without storing data to be transmitted into the buffer. As a result, the ratio of the number of received data stored in the transmitting and receiving buffer 56 to the number of data to be transmitted is increased, resulting in a raised data receiving capability. Further, if loads of all processors and capacities of all transmitting and receiving buffers 56 are equivalent to each other, data transmission is temporarily and simultaneously stopped in all of the processors. Therefore, data stops flowing on the transmission path 01, and the number of received data stored in the transmitting and receiving buffer of each processor also decreases as each processor removes data items from its buffer, resulting in an enhanced data receiving capability.

When the received data monitoring means 15 or the buffer monitoring means 57 detects an abnormal state by checking the number of data items stored in the buffer, the means 15 or 57 directly informs the message sending means 16 or the data transmitting means 54 about it in the above described two embodiments. Alternatively, however, the means 15 or 57 may indicate the abnormal state via a flag. Upon detecting an abnormality, the received data monitoring means 15 or the buffer monitoring means 57 sets a flag. The message sending means 16 or the data transmitting means 54 always monitors this flag. When the flag is set, the message sending means 16 or the data transmitting means 54 sends out a message or stops data transmission.

Figure 8:
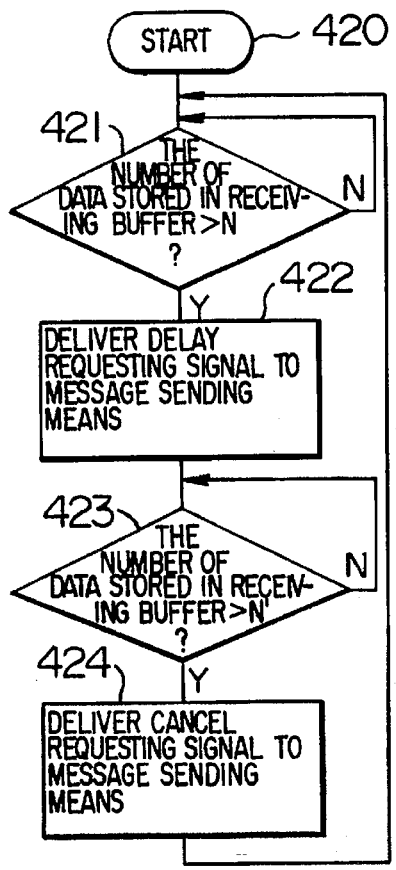
FIGS. 8 to 10 are flow charts of received data monitoring means, message sending means and data transmitting means of a third embodiment, respectively.
Figure 9:
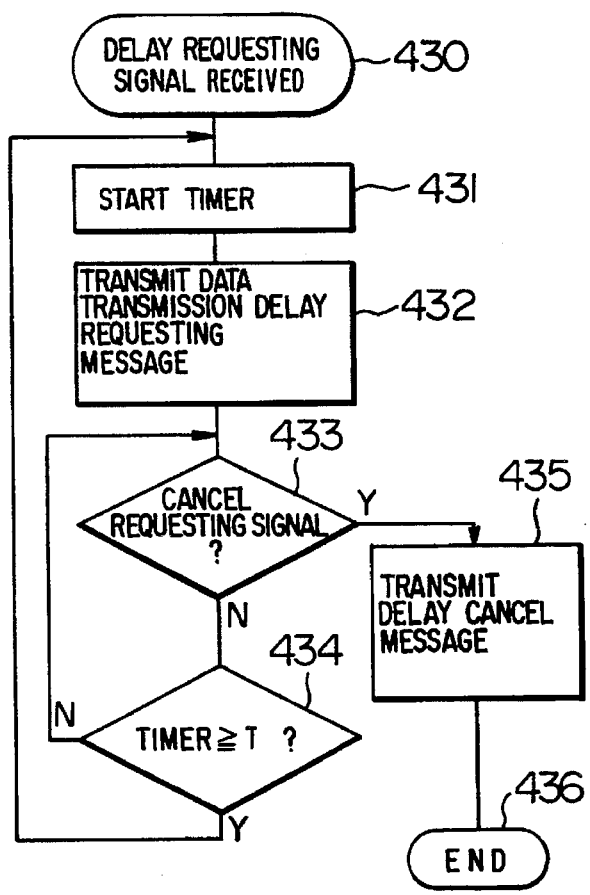
Figure 10:
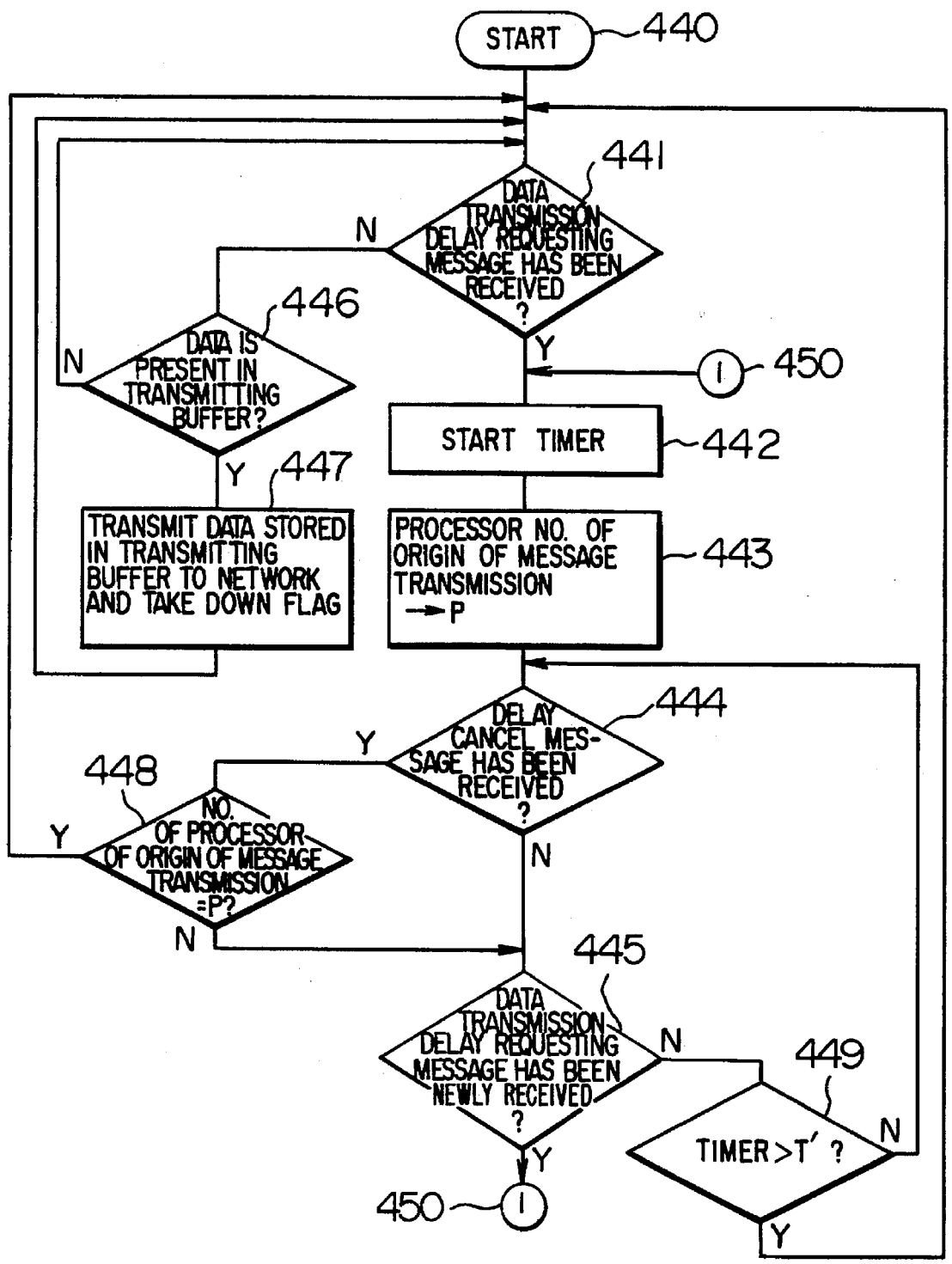

A third embodiment of the present invention will now be described by referring to the drawings. In the present embodiment, a data transmission delay is canceled by a cancel requesting message supplied from a processor which has issued the delay request. Operation of the received data monitoring means 15, the message sending means 16 and the data transmitting means 17 shown in FIG. 2B will now be described by referring to FIGS. 8 to 10. First of all, operation of the received data monitoring means 15 will now be described by referring to FIG. 8. The received data monitoring means 15 always monitors the number of data items in the receiving buffer 14. When the number of data items exceeds a fixed number N (step 421), the received data monitoring means 15 considers that the load of the processing unit 12 becomes large and the receiving buffer may become full, and the means 15 issues a delay requesting signal to the message sending means 16 (step 422). Thereafter, the received data items monitoring means 15 monitors the number of data stored in the receiving buffer 14 again. When the number of data items becomes smaller than a fixed number N' (step 423), the received data monitoring means 15 supplies a cancel requesting signal to the message sending means 16 (step 424) and returns to its original state. N' has a value smaller than or equal to that of N. The delay requesting signal and the cancel requesting signal to be delivered to the message sending means 16 are defined between the received data monitoring means 15 and the message sending means 16. For example, these signals can be implemented by defining a Boolean variable as the delay requesting signal when it is "1" and as the cancel signal when it is "0" and by making always the variable "0" while the delay requesting signal is not being issued. Operation of the message sending means 16 will now be described by referring to FIG. 9. Upon receiving the delay requesting signal (step 430), the message sending means 16 begins to measure time by using a timer (step 431) and sends a data transmission delay requesting message with a format shown in FIG. 4 to the transmission path or network 01. In the data transmission method of this system, broadcast transmission which does not use the address of the destination of the receiving processor is employed. Therefore, the data transmission delay requesting message is received by all of the other processors located on the network 01. Thereafter, the message sending means 16 judges whether the cancel requesting signal has been delivered from the received data monitoring means 15 or not (step 433). If the cancel requesting signal has been delivered, the delay cancel message is broadcast to the network 01 (step 435). Unless the cancel requesting signal has been delivered, the message sending means 16 checks the value of the timer. If the value of the timer is not less than a fixed time T, the message sending means returns to the step 431. If the value of the timer is less than T, the message sending means returns to the step 433 (step 434). By repeating such operation, it is possible to transmit a data transmission delay requesting message at fixed time intervals following reception of the delay requesting signal until reception of the cancel signal. Operation of the data transmitting means 17 will now be described by referring to FIG. 10. On the basis of the message of the data receiving means 13, the data transmitting means 17 judges whether the data receiving means 13 has received the data transmission delay requesting message or not (step 441). If the data receiving means has already received the data transmission delay requesting message, the data transmitting means 17 begins to measure time by using the timer (step 442) and substitutes the processor number 214 contained in the message (see FIG. 4) into a variable P (step 443). The data transmitting means then judges whether the delay cancel message has been received or not (step 444). If the delay cancel message has not been received, the data transmitting means judges whether the data transmission delay requesting message has been newly received (step 445). If it has been newly received, the data transmitting means returns to the step 442 and starts counting in the timer, and the processor No. of the origin of transmission of the new message is substituted into P (step 443). If the message is judged not to be newly received at the step 445, the value of the timer is checked (step 449). If the value of the timer is larger than a fixed time T', the data transmitting means returns to the step 441. If the value of the timer is not larger than T', the data transmitting means returns to the step 444. T' must be longer than the fixed time T of the message sending means. In case it is judged at the step 444 that the delay cancel message has been received, the data transmitting means returns to the step 441 when the No. of the processor which has transmitted the delay cancel message is equal to P (step 448). If the No. of the processor is not equal to P, the data transmitting means proceeds to the step 445. As a result, the delay state is always canceled by the latest data transmission delay requesting message and the delay cancel message from the same origin of transmission. If it is judged at the step 441 that a message has not been received, it is checked whether data is present in the transmitting buffer 18 or not (step 446). If data is not present, the data transmitting means returns to the step 441. If data is present, the data transmitting means broadcasts data stored in the transmitting buffer 18 to the network, and sets the flag 201 corresponding to transmitting data at "0" (step 447). Data stored in the transmitting buffer can be transmitted by transmitting all of the data stored in the transmitting buffer at one time or alternatively transmitting data by data. In case the latter method is adopted, it is contemplated that data stored in the buffer is transmitted beginning from the oldest data. As a result of the operation heretofore described and performed by respective means, effects described below are obtained. First of all, by using a flag representing whether data is present or not in each data storing area of the receiving buffer 14 and the transmitting buffer 18, it has been facilitated to judge how many data items are already contained in the buffer. A second effect will now be described. Since the data transmitting means 17 memorizes the processor No. of the origin of transmission of the latest data transmission delay requesting message, it is possible to prevent the delay state of the whole system from being canceled by a delay cancel message of another processor even if a processor which has not got through the delay requesting state yet is present. The second effect will now be described in detail by referring to FIG. 11. It is now assumed that three or more processors are connected to the network. First of all, a processor 1 issues a delay request at time $t_1$ and thereafter a processor 2 issues a delay request at time $t_2$. Although the processor 1 cancels the delay at time $t_3$, the processor 2 does not cancel the delay yet. As the whole system, therefore, the delay must not be canceled at $t_3$. A similar constraint holds true after the processor 3 issues a delay request at time $t_4$ as well. After all, data transmission in the system as a whole must be suppressed from time $t_1$ until $t_6$ when the processor 3 cancels the delay.

In a fourth embodiment of the present invention, a one-to-one communication scheme using an address is employed instead of the broadcast scheme, which does not use an address, as the transmission scheme. In this case, the address of the destination is described instead of the content code 212, and the data transmission delay requesting message and the delay cancel message are put in the section of the information 215 (see FIG. 4). The configuration of the whole system, the configuration of the data transmitting and receiving device, and the operation flow charts of respective means other than the message sending means are the same as those of the first embodiment. The message sending means memorizes addresses of all nodes on the network, and sends out all of the messages having addresses of respective nodes when it sends out messages. The effect of the present embodiment will now be described. Since data flowing on the network does not contain content codes and one-to-one communication is performed by using an address, each processor need not discriminate the content code of data taken in. Therefore, the processing within the receiving processor is simple, resulting in an effect of the present embodiment.

In the first to fourth embodiments heretofore described, the present scheme is performed in the interface section (11 shown in FIG. 2B). However, the present scheme may be performed in the communication control program of the processing unit side. In case the present scheme is incorporated into the processing unit side, it is possible to implement highly reliable broadcast communication by using the already existing LAN (Local Area Network) as it is.

A fifth embodiment will now be described in detail.

FIG. 12A is a block diagram showing the configuration of the whole system in which the present invention is embodied. Numerals 1100, 1101 and 1102 denote processors. Processors 1100, 1101 and 1102 have bus control processors (hereafter abbreviated to BCP) 1110, 1111 and 1112, respectively, and are connected to a bus 1010.

Figure 12B:
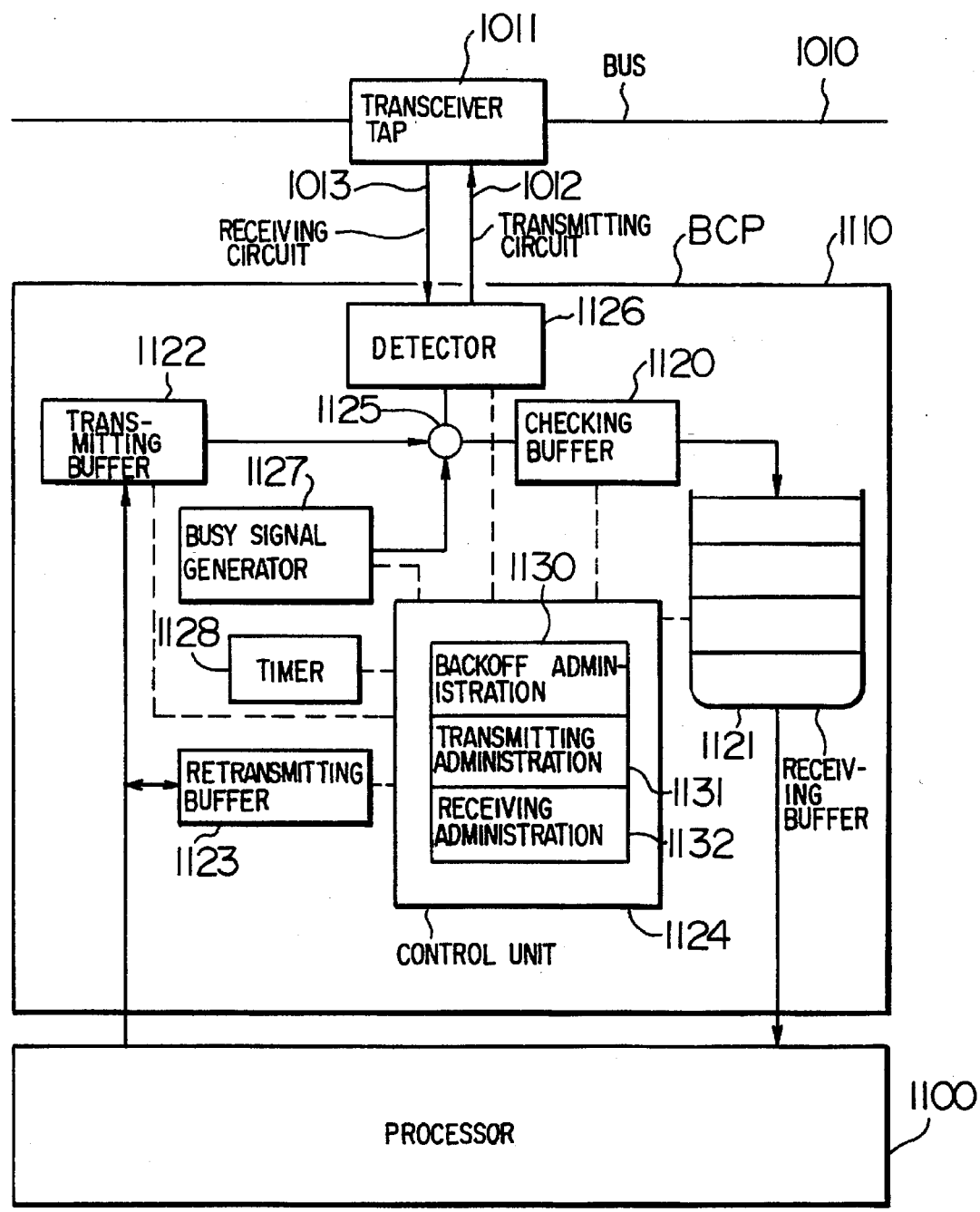
FIG. 12B is a block diagram showing detailed configuration of a BCP.

FIG. 12B is a block diagram showing the entire configuration of the BCP. The BCP provides a flow of data fed from a transmitting circuit 1012 to a bus or network 1010 via a transceiver tap 1011, and takes in a signal on the network via a receiving circuit 1013.

A message taken into the BCP is transferred to the processor 1100 via a checking buffer 1120 and a receiving buffer 1121. A message transmitted from the processor 1100 is caused to flow to the network via a transmitting buffer 1122 within the BCP. Control regarding the transmission and reception is performed by a control unit 1124 included in the BCP.

Assuming that the signal propagation time between processors located at both ends of the bus is D the length of a message used in the system in which the present invention is applied is so defined that the message may be continuously transmitted for at least 2D.

Figure 17:
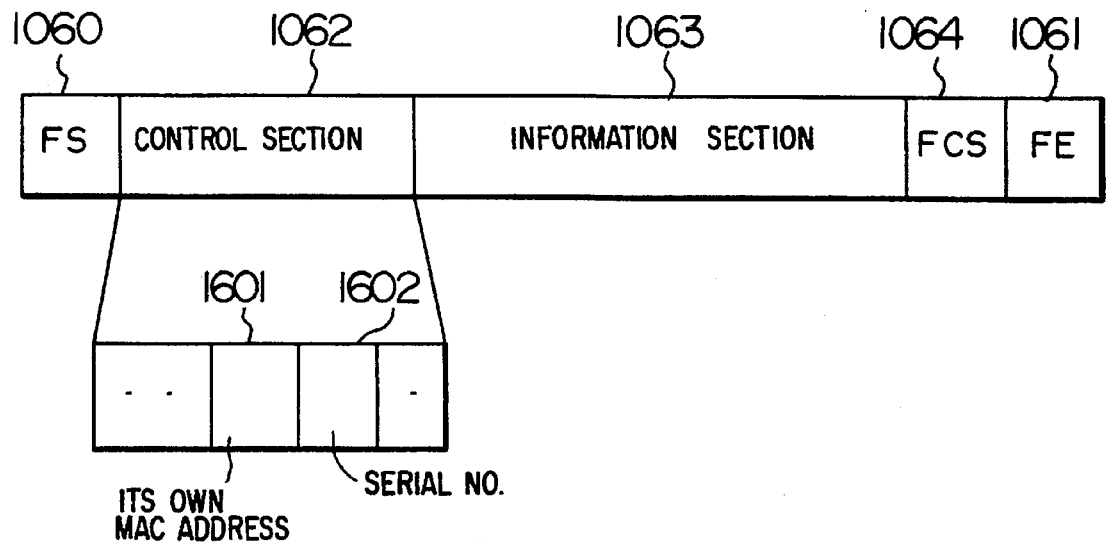
FIG. 17 is a diagram for explaining a message format.

FIG. 17 shows a message format used in the present system. In FIG. 17, FS 1060 and FE 1061 are flags indicating the start and end of the message. A message section comprises a control section 1062, an information section 1063, and a frame check sequence (FCS) 1064 for checking transmission errors in data. The control section 1062 comprises its own MAC address 1601 for indicating which processor has sent out the message and a serial No. 1602 for indicating in which sequential number the data is generated by the processor. Although not illustrated in FIG. 17, information required for interprocessor communication and the like are added to the control section 1062 as occasion demands.

First of all, the case where the receiving buffer 1121 becomes full will now be described.

Figure 13:
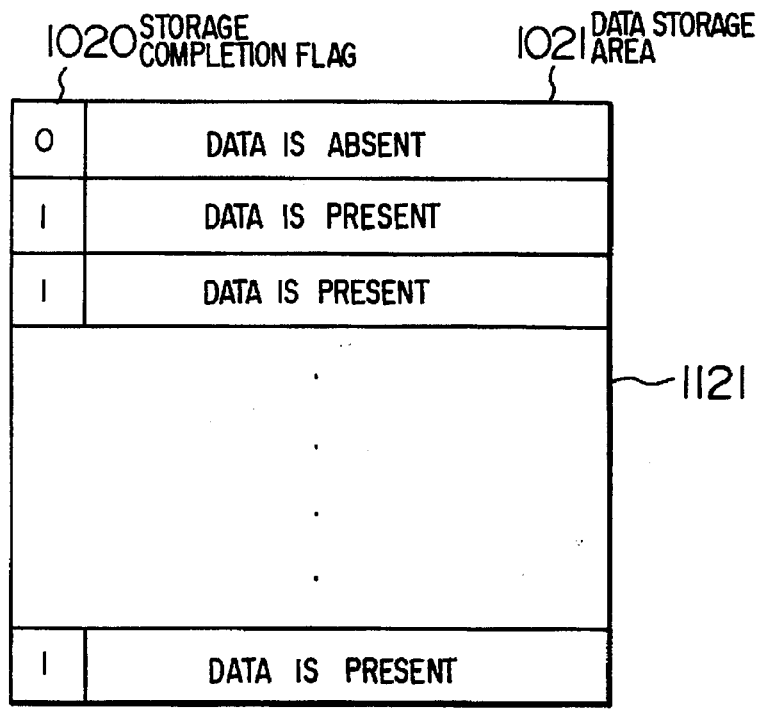
FIG. 13 is a diagram for explaining a receiving buffer.

FIG. 13 is a configuration diagram of the receiving buffer 1121. This receiving buffer comprises a storage completion flag 1020 and a data area 1021 for storing data therein.

Figure 14:
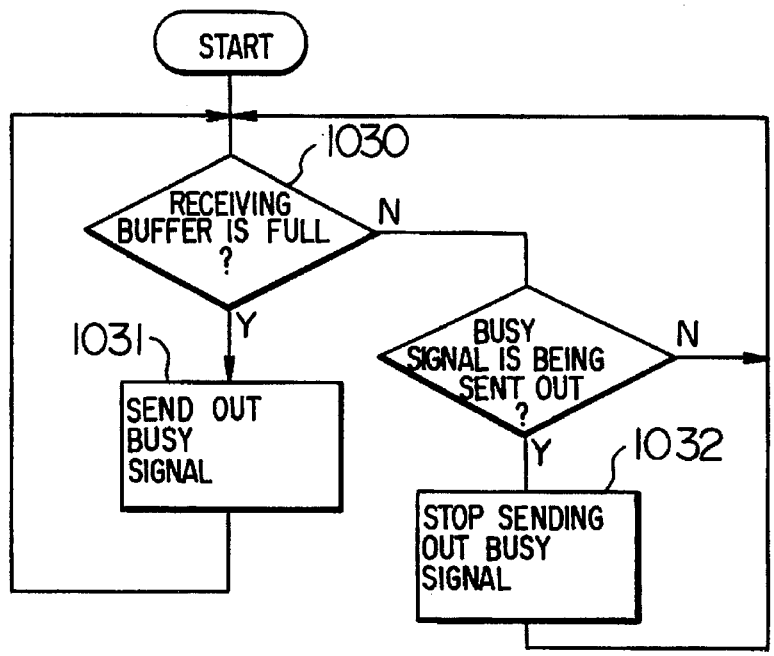
FIG. 14 is a processing flow chart of buffer full detection processing and busy signal sending processing.

FIG. 14 is a flow chart of buffer detection and busy signal sending.

In FIG. 12B, a receiving administration section 1132 monitors all storage completion flags 1020 contained in the receiving buffer 1121 (step 1030). If all storage completion flags 1020 are "1", the receiving administration section judges that the receiving buffer 1121 is full and sends out a busy signal to the network (step 1031). The busy signal is generated by a busy signal generator 1127 shown in FIG. 12B and is sent out continuously until the receiving buffer 1121 becomes ready to store data. If a message is sent out from another processor while a busy signal is being sent out as shown in FIG. 12D, this message collides with the busy signal. If the receiving buffer 1121 becomes ready to store data, the busy signal is rapidly stopped (step 1032) and a message from another processor is received as shown in FIG. 12C.

Figure 15:
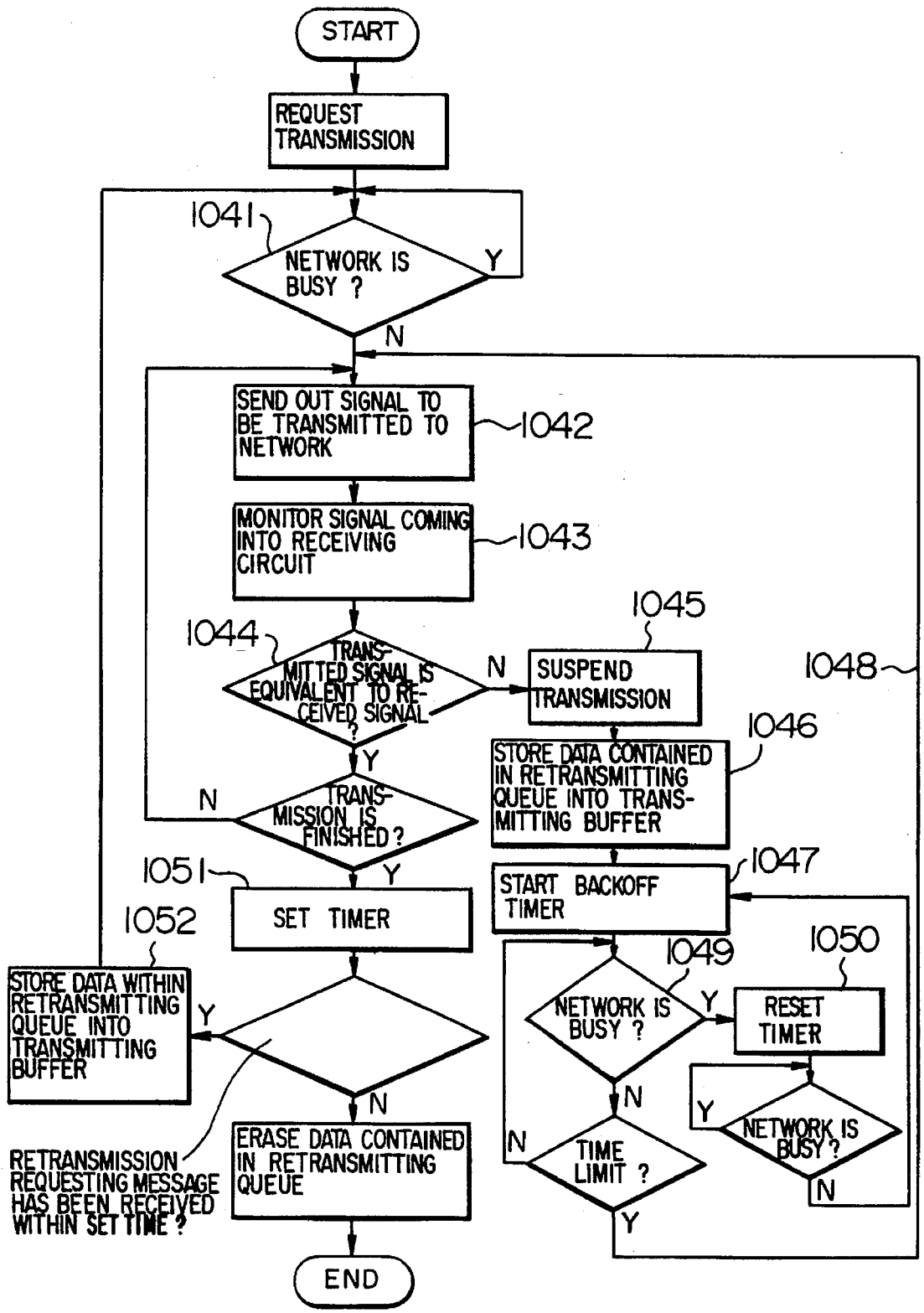
FIG. 15 is a flow chart of transmission processing.

The processing flow of message transmission will now be described by referring to FIG. 15.

A message generated in a processor is transferred to a transmitting buffer 1122 and is simultaneously transferred to a retransmitting buffer 1123 as well. Assuming now that a processor ready to transmit a message is 1100 shown in FIG. 12A, the BCP 1110 of the processor 1100 monitors whether the network is busy or not (step 1041). When the network becomes idle, the BCP 1110 sends out a message to be transmitted to the network (step 1042). This transmitted signal immediately enters the receiving circuit 1013.

The signal on this receiving circuit 1013 is monitored (step 1043) and compared with the transmitted signal in a detector 1126 (step 1044). If the transmitted signal is different from the received signal, it is judged that the transmitted signal has collided with a signal sent out from another processor (i.e., a signal of transmitted message or a busy signal), and transmission is suspended (step 1045). A message contained in the retransmitting buffer 1123 is copied into the transmitting buffer 1122 (step 1046). Time randomly defined by a backoff administration section 1130 is set into a timer 1128 (step 1047). The time thus set is waited and the message is retransmitted (step 1048). If the network becomes busy during this waiting time (step 1049), the timer 1128 is reset (step 1050). The operation waits for the network to become idle, the time randomly defined by the backoff administration 1130 is set into the timer 1128, and a similar retransmission processing (step 1048) is performed.

If the signal being sent out is entirely coincident with the signal being received until the transmission is finished, the transmission is judged finished. Due to the possibility of a retransmission request transmitted from a processor of a receiving side which has detected a bit missing caused by a transmission error, however, the retransmission request receipt time is set in the timer 1128 (step 1051). If a retransmission request has not come within the set time, the message within the retransmitting buffer is erased, and the retransmission processing is finished. If a retransmission request has come within the set time, the message within the retransmitting buffer 1123 is copied into the transmitting buffer 1122 (step 1052). It is then monitored whether the network is busy or not (step 1041). The operation waits for the network to become idle and then retransmission is performed. The above described processing is then repeated.

The above described backoff processing for collision detection and retransmission is but one example for explaining the present embodiment. All functions of communication protocol, such as CSMA/CD, for a network of the bus type now in use are applied thereto. In the present embodiment, the signal sending operation other than backoff processing is performed at the same time that the network becomes idle. The timing of the CSMA system now in use is applied to this signal sending timing as well.

Figure 16:
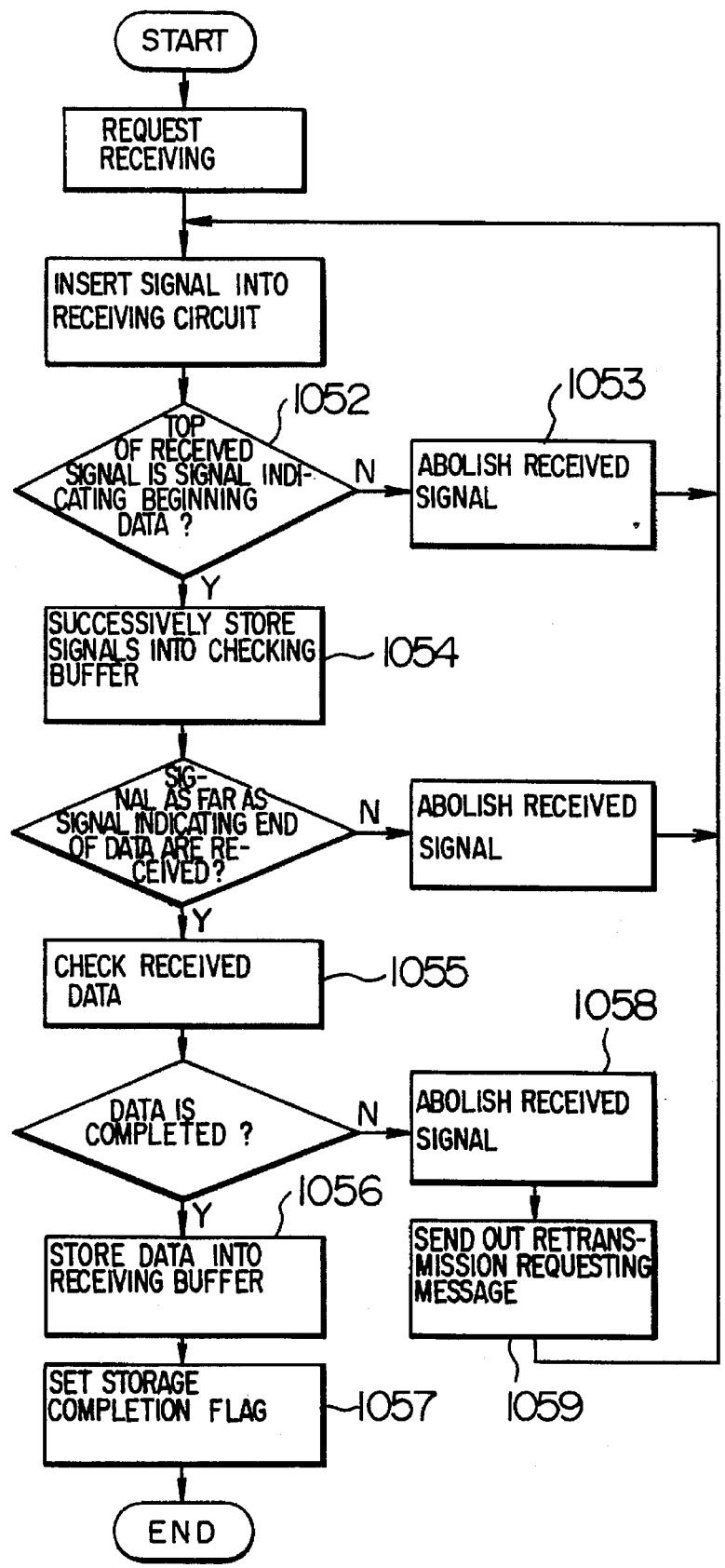
FIG. 16 is a flow chart of receiving processing.

Message receiving processing will now be described by referring to FIGS. 16 and 17.

A processor of the receiving side first checks whether the top of a signal coming into the receiving circuit indicates data or not, and judges whether the received signal is a message transmitted from another processor or a busy signal (step 1052). That is to say, unless the signal at the receiving circuit is a signal indicating the flag 1060 representing the beginning of a message, the signal is judged to be a busy signal and that signal is abolished (step 1053). If the signal at the receiving circuit is a signal indicating the flag 1060 representing the beginning of a message, succeeding signals are successively stored into the checking buffer 1120 (step 1054). When signals as far as a signal indicating the flag 1061 representing the end of the message have been stored, a bit check is performed in order to detect a bit missing or the like caused by transmission error by using the frame check sequence 1064 added to the message (step 1055). Further, it is checked whether data is new data or not by performing a serial number check. If it is a complete message, it is stored in the receiving buffer 1121 (step 1056), and a storage completion flag is set (step 1057). This storage flag is cleared to zero when data stored in the area has been transferred to the processor. In case a transmission error has been detected, the received signal is abolished (step 1058), and a retransmission requesting message is sent out (step 1059).

On the other hand, in case a signal indicating the flag 1061 representing the end of a message cannot be received, the received signal is abolished. In this case, the processor at the receiving side judges that the processor at the transmitting side has detected a collision and has suspended transmission or the processor at the receiving side has malfunctioned. The processor at the receiving side does not request retransmission.

In the above described receiving processing, it is now assumed when succeeding signals are successively received after the start of the message has been received, the processor at the transmission side detects collision and suspends transmission. In case collision at this time is caused by a busy signal, the busy signal is sent out as it is. Therefore, the processor at the receiving side continues to receive the busy signal. If the busy signal is sent for a long time, therefore, trouble is caused in the processor at the receiving side. When the checking buffer 1120 stores signals exceeding a fixed value, therefore the receiving administration section 1132 has the function of abolishing the signals.

A sixth embodiment will now be described.

In the present embodiment, only a processor which has acquired the right of transmission can perform transmission.

Assuming in FIG. 12A that a processor which has acquired the right of transmission is 1100, the processor 1100 sends a message stored in the transmitting buffer 1122 into the network. At this time, collision detection is performed by using the detector 1126 in the same way as the fifth embodiment. A detailed description of bit check in receiving and collision detection flow in transmission of the sixth embodiment will be omitted.

Figure 18:
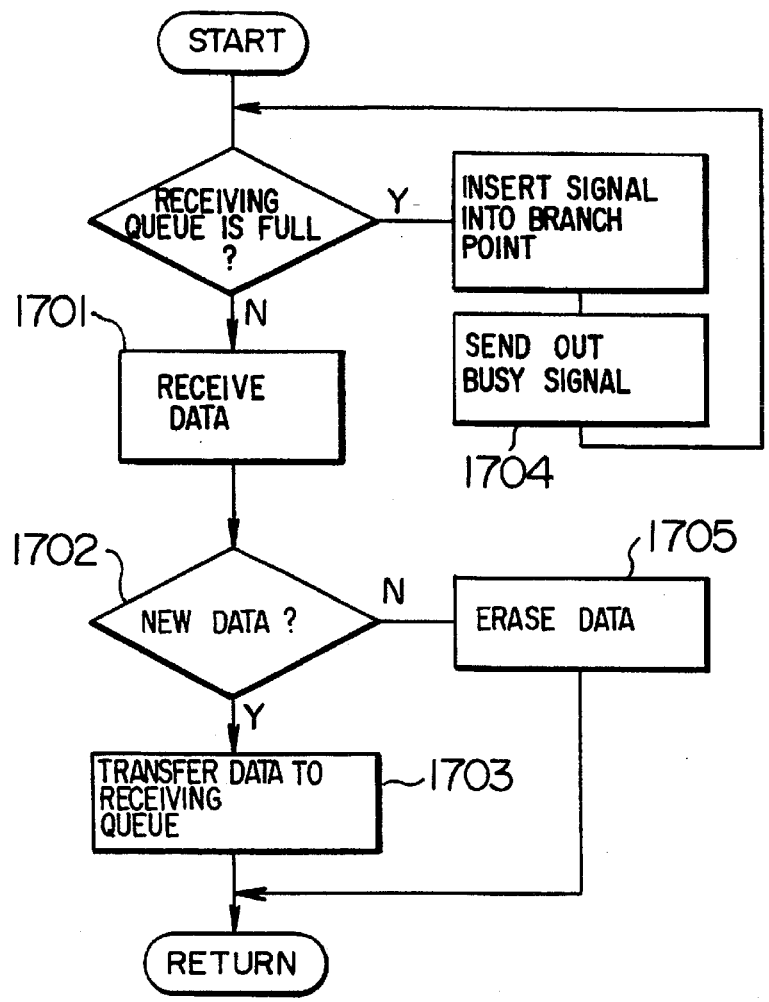
FIG. 18 is a processing flow chart of receiving processing and busy signal sending in a sixth embodiment.

First of all, receiving processing will be described by referring to FIG. 18.

A processor which has no right of transmission monitors storage completion flags contained in the receiving buffer 1121. If the receiving buffer 1121 is in such a state that a message can be stored therein, the processor which has no right of transmission takes in a message flowing through the network (step 1701). On the basis of the serial number of the message, it is judged whether the received message is new data or not (step 1702). If the received message is a new message, the processor transfers it to the receiving buffer 1121 (step 1703). If the received message is not a new message, the processor erases the data (step 1705).

If the receiving buffer 1121 is full, however, the busy signal is sent out the instant the top of a bit train of the message is received by a branch section 1125 (step 1704). Sending this busy signal gives rise to collision with a message.

Figure 19:
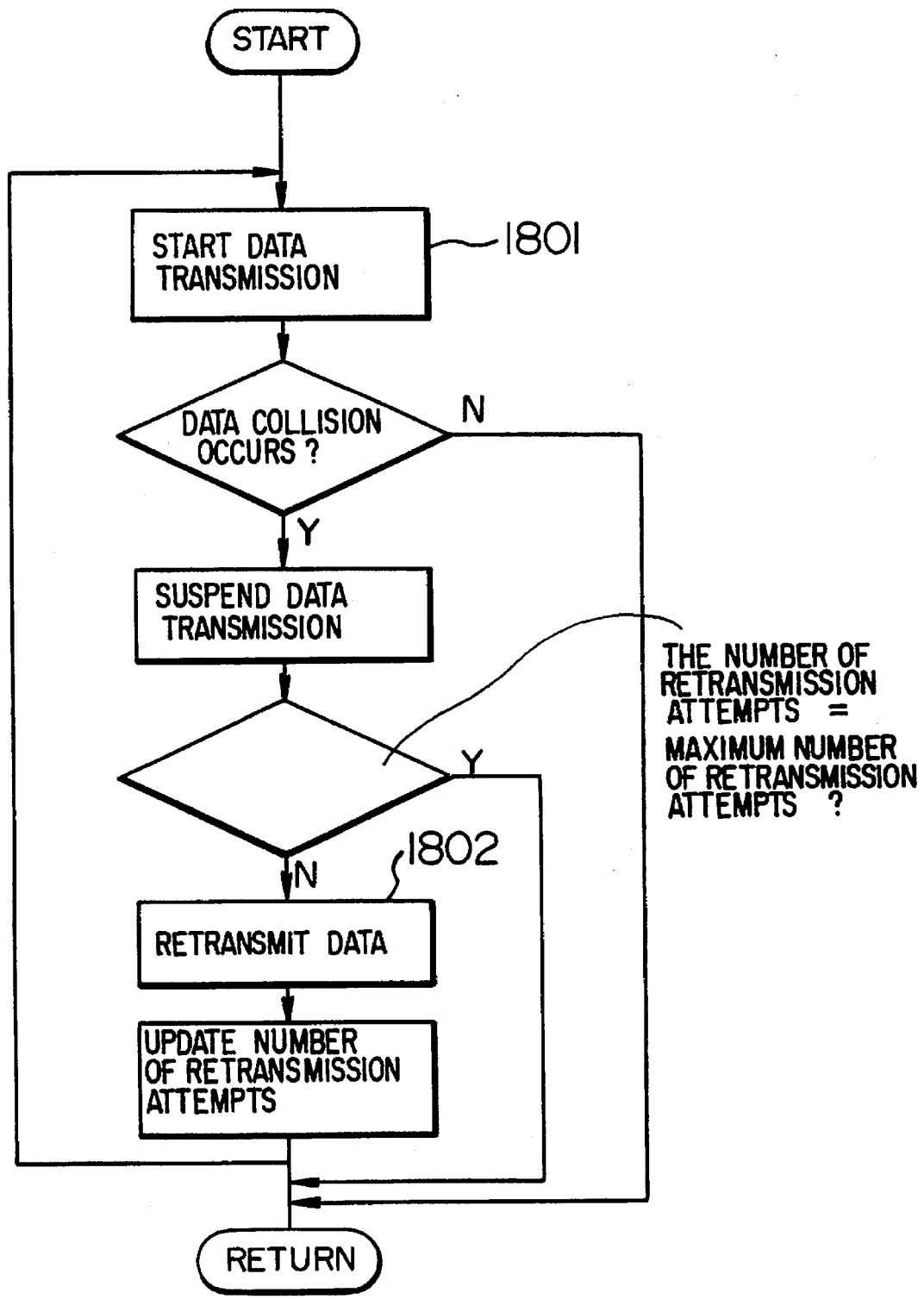
FIG. 19 is a flow chart of transmission processing performed in the sixth embodiment.

Transmission processing will now be described by referring to FIG. 19.

The processor 1100 at the transmission side starts transmission (step 1801). If a collision is detected although transmission is performed, it is judge that the transmitted message is not broadcast to all processors, and retransmission is attempted (step 1802). If the collision disappears during the message transmission, the broadcast can be judged successful, and the message stored in the retransmitting buffer is erased.

Owing to the above described method, the processor at the transmission side can judge whether broadcast has been successful or not at the same time that it transmits the message. In bus communication, therefore, reliable broadcasting can be achieved.

In the embodiments of the present invention heretofore described, the fact that a processor which is not ready to receive a message because the receiving buffer is full is present in a system can be detected by the message sending side on the basis of detection of occurrence of collision of a message it has generated by itself, and retransmission can thus be performed. The full state of the receiving buffer is usually temporary. While the message retransmission is being performed, data stored in the receiving buffer is processed, resulting in a receivable state.

If processing becomes impossible in the configuration of FIG. 12B because of occurrence of an abnormality, such as the processing falling into an infinite loop in the processor 1100 or interruption of power supply at the processor 1100 side (in case the BCP and the processor have separate power supply units), however, data stored in the receiving buffer of the BCP 1110 remains unprocessed and the receiving buffer remains in a full state. An example in which a processor abnormality detecting mechanism is incorporated into the BCP will hereafter be described with reference to FIG. 20. When a message stored in the receiving buffer 1121 is sent out to the processor 1100, a processor abnormality detecting function section 1133 judges whether the sending has been normally finished or not. In case of failure, the message is sent out again to the processor when a predetermined interval has elapsed. In case the sending is not normally finished even if retransmission is repeated a predetermined number of times, the processor is judged to be out of order, and a processor down sensing flag 1134 is set. Information indicating that the processor is down is then sent out to the network. When the receiving buffer is full, the same processing as that of the embodiment shown in FIGS. 5 and 6 is performed provided that the processor down sensing flag 1134 is reset. If the flag 1134 is set, however, processing as described below is performed. That is to say, a busy signal is not issued even if the receiving buffer is full. When a message is received from the network, one old data stored in the receiving buffer is erased, and a message from the network is taken in. Further, the BCP 1110 which has detected that the processor is down continues to send the message stored in the receiving buffer to the processor. On the basis of result of normal sending, the BCP 1110 detects recovery of the processor from a breakdown state and resets the processor down sensing flag 1134.

An eighth embodiment of the present invention will now be described in detail by referring to FIGS. 21A, 21B and 22. First of all, the entire configuration of a system in which the present invention is applied will now be described by referring to FIG. 22. Numeral 2001 denotes a unilateral ring-shaped transmission path for transmitting messages in a direction indicated by an arrow. Numerals 2010 to 2060 denote network control processors (hereafter abbreviated to NCP) for performing message transmission control on the transmission path on the basis of a token passing scheme. Further, numerals 2011 to 2061 denote processing units respectively connected to NCP 2010 to 2060 so as to perform aimed processing while keeping in contact with each other via this network. In the present embodiment, the ring-shaped transmission path is a single transmission path. However, the ring-shaped transmission, path need not be single. Even if a multi-ring transmission path or a bilateral double ring having an alternate circuit configuration is used, the present invention is applicable thereto.

FIG. 21A shows the configuration within the NCP 2010. The NCP 2020 to 2060 have the same configuration as that of the NCP 2010. An interface 2101 is a section for administrating message reception from the transmission path 2001 and message transmission to the transmission path 2001. A processor 2102 administers transmission control processing performed in the NCP 2010. A first receiving buffer 2104 and a second receiving buffer 2105 provides areas for storing therein messages received from the network. An area corresponding to one message is assigned to the first receiving buffer 2104. Further, an area for storing a predetermined number of messages therein is assigned to the second receiving buffer 2105, which has a cyclic buffer configuration. A second receiving buffer administering flag 2106 is a flag indicating whether the second receiving buffer 2105 is full or not, i.e., whether no other message can be stored into the second receiving buffer 2105 or not. A transmitting buffer 2107 is a buffer for storing therein a message to be transmitted to the network. The transmitting buffer 2107 has a cyclic buffer configuration in the same way as the second receiving buffer 2105. A transmitting buffer administering flag 2108 is a flag indicating whether a message to be transmitted is, present in the transmitting buffer or not. When the processor 2102 receives data to be transmitted from the processing unit 2011 connected thereto, the processor 2102 stores the data into the transmitting buffer 2107 and sets the transmitting buffer administering flag 2108. When all messages stored in the transmitting buffer 2107 are sent out to the network and the transmitting buffer 2107 becomes idle, the processor 2102 resets the transmitting buffer administering flag 2108. A timer 2109 is provided for detecting whether a transmitted message returns within a fixed time or not. A content code table 2110 is a table for storing therein a content code of a message to be taken into the NCP 2010 (i.e., a code indicating contents of the message). Contents of the table 2110 are set and updated by a specification fed from the processing unit (2011 of FIG. 22). A retransmitting counter 2111 is provided for counting retransmission attempts of the transmitted message. A received message serial number table 2112 is a table for checking double reception of the retransmitted message. A busy flag 2113 is a flag for indicating whether its own NCP acquires a free token and occupies the network or not. A message serial number counter 2114 indicates the value of a serial number added to a message to be transmitted. The count of the message serial number counter 2114 increases by one whenever it receives the transmitted message from the processing unit 2011. Further, an interface 2103 is provided for controlling delivery and receipt of data with respect to the processing unit (2011 of FIG. 22). In the present configuration, a message received from the network 2001 is stored into the first receiving buffer 2104 or the second receiving buffer 2105 via the interface 2101 and a line 2120. A message stored in the transmitting buffer 2107 is sent out to the network 2001 via a line 2130 and the interface 2101. A line 2140 is provided to send a signal for controlling the message flow within the interface 2101. It is now assumed that different addresses are assigned to respective NCPs.

Figure 21B:
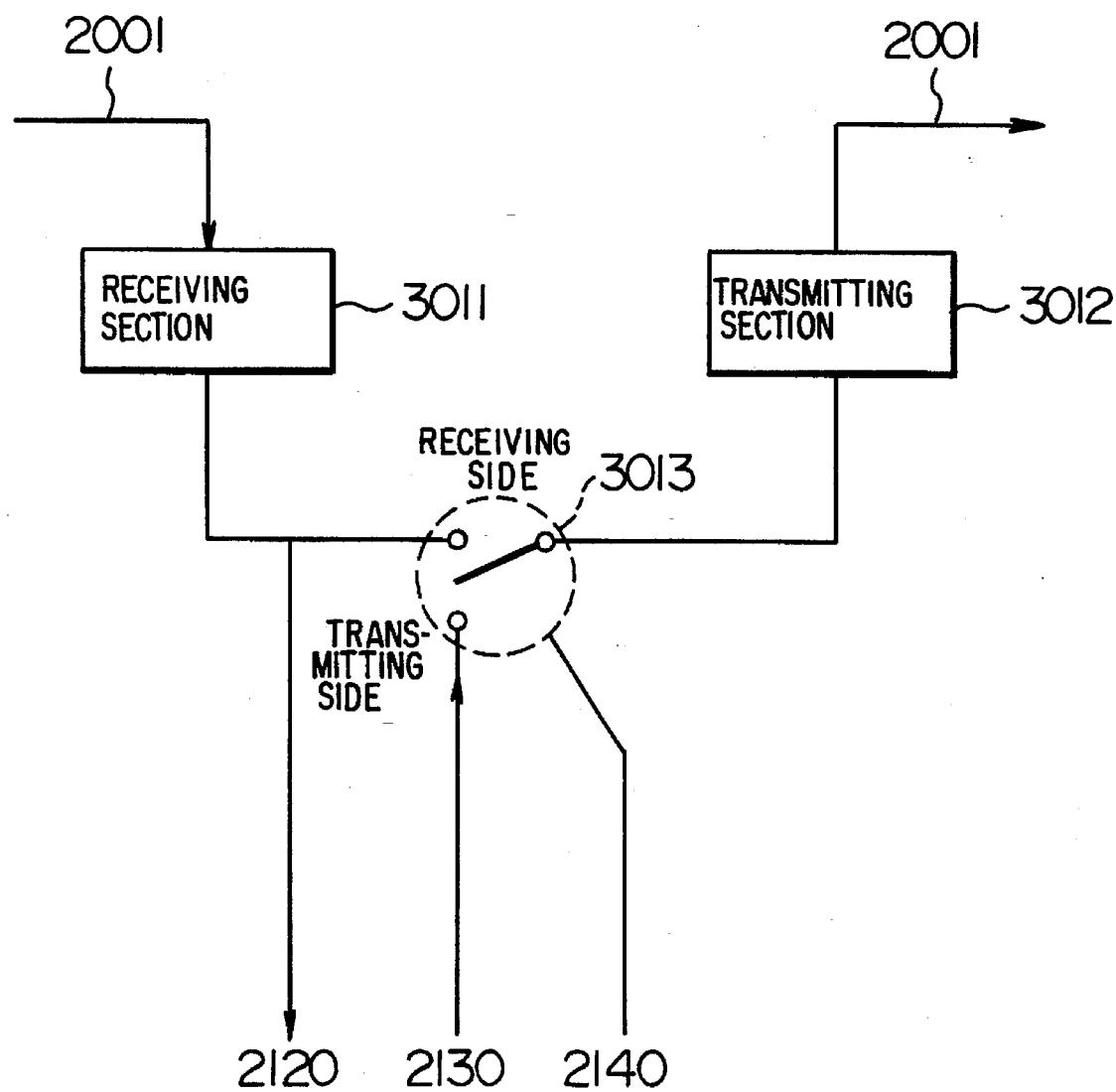
Figure 22:
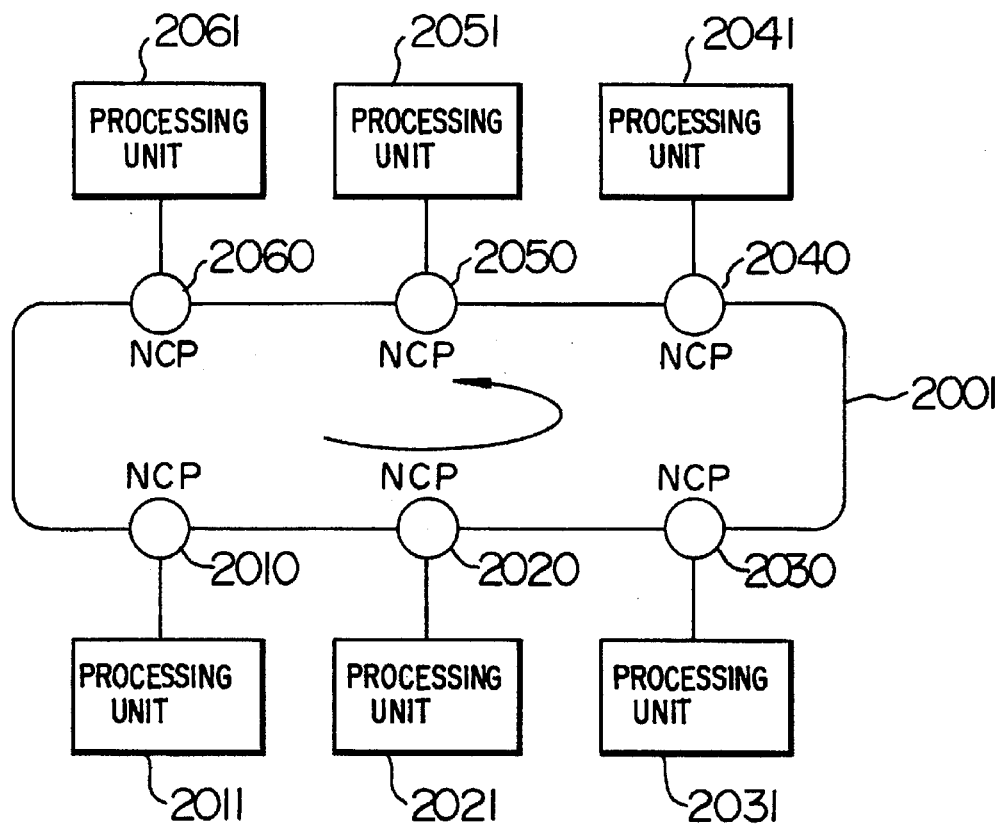
FIG. 22 is a diagram showing an entire system configuration.

The internal configuration of the interface 2101 is shown in FIG. 21B. A message on the transmission path 2001 is taken into the interface by a receiving section 3011 and sent to the processor 2102 via the line 2120. At the same time, the message is sent to a switch 3013 included in the interface as well. When the switch 3013 is connected to the receiving side, the message taken in is outputted to the transmission path 2001 as it is via a transmitting section 3012. When the switch 3013 is connected to the transmitting side, the message taken in disappears at the switch section. When the switch 3013 is connected to the transmitting side, a message stored in the transmitting buffer 2107 is outputted onto the transmission path 2001 via a line 2130 and the transmitting section 3012. Changeover of the switch 3013 is performed by a control signal outputted by the processor 2102 via the line 2140.

Figure 23A:
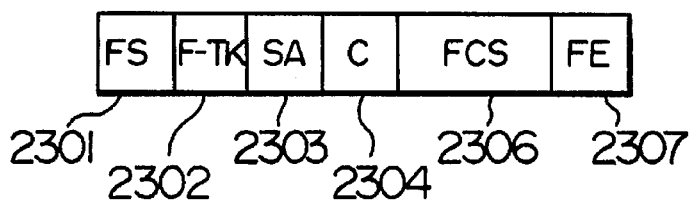
FIGS. 23A and 23B are diagrams showing a message format.
Figure 23B:
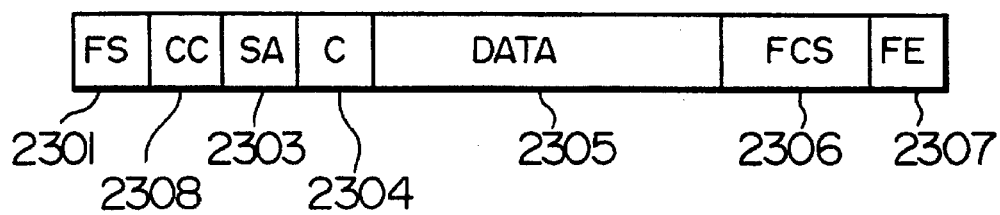

FIGS. 23A and 23B show formats of messages flowing on the network. In the token passing system, a free token makes the round on the network when messages to be transmitted are not present in respective NCPs. An NCP in which a message to be transmitted is generated takes this free token in, converts it to a busy token, adds the message to be transmitted to the end of the busy token, and sends out the resultant busy token plus message to the network. FIG. 23A shows the format of a free token message. FS 2301 and FE 2307 are flags indicating the start and end of the message, respectively. Numeral 2302 denotes an area for storing therein a code indicating the contents of the message. In case of the present message, F-TK indicating that the token is a free token is stored in the area 2302. SA 2303 is the address of an NCP which has generated the message. C 2304 is a serial number required for transmission, and FCS 2306 is data for error detection. FIG. 23B shows the format of the busy token message. FS 2301, FE 2307, SA 2303, C 2304 and FCS 2306 are the same as those of FIG. 23A. DATA 2305 denotes information to be transmitted. Area 2308 indicates a content code CC representing contents of the information data 2305. The free token F-TK 2302 of FIG. 23A is a code different from the content code CC 2308 of FIG. 23B. In each NCP, a message having a code other than the free token F-TK is regarded as a busy token. In the present embodiment, an identical area is used as the area indicating the identification of the token and as the area indicating contents of the data. However, a format having a token identifying area and a content code storage area separately provided may be used. Further, a value of the message serial number counter 2114 of. FIG. 21A is set into the C 2304.

Figure 24A:
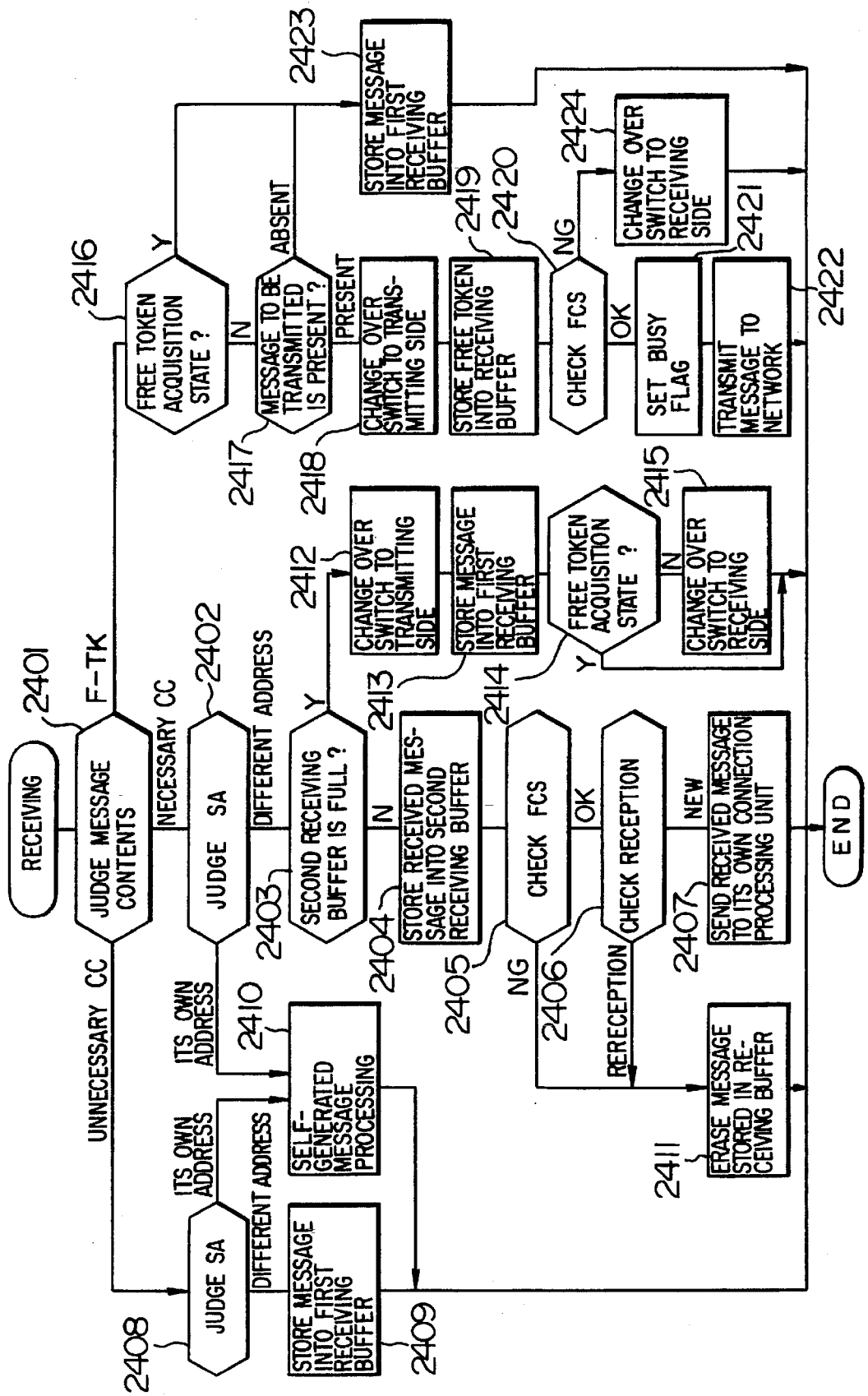
FIGS. 24A, 24B and 24C are diagrams for explaining receiving processing performed in each NCP.

The processing flow in each NCP of the present embodiment will be described by referring to FIGS. 24A, 24B, 24C, 25A and 25B. FIG. 24A is a flow chart of message reception in each NCP. In the following description, it is assumed that a switch 3013 included in the interface 2101 as shown in FIG. 21B is so set as to be connected to the receiving side. That is to say, it is assumed that the message received from the network is inputted to the processor 2102 and simultaneously outputted to the network as it is. When a message is received from the network, the content code area (2308 of FIG. 23B) in the message is first judged (processing step 2401). If the received message is the free token F-TK, it is first judged on the basis of the busy flag area (2113 of FIG. 21A) whether its own NCP is in the free token acquisition state or not (processing step 2416). In case of the free token acquisition state, the received message is stored in the first receiving buffer (2104 of FIG. 21A) (processing step 2423), and processing is finished. When its own NCP is not in the free token acquisition state, it is judged on the basis of the transmitting buffer administering flag (2108 of FIG. 21A) whether a message to be transmitted is present or not (processing step 2417). If a message to be transmitted is not present, processing step 2423 is executed and the processing is finished. When a message to be transmitted is present, the switch 3013 included in the interface as shown in FIG. 21B is changed over to the transmitting side (processing step 2418) to prevent the received free token from being outputted to the network. On the other hand, the received free token is stored into the first receiving buffer (2104 of FIG. 21A) (processing step 2419). By using the FCS (frame check sequence) data (2306 of FIG. 23B), it is checked whether an error such as bit disguise is present or not (processing step 2420). When an error is present, the switch 3013 in the interface is changed over to the receiving side (processing step 2424) and the processing is finished. When an error is not present, the busy flag (2113 of FIG. 21A) is set (processing step 2421) and the message stored in the transmitting buffer is transmitted to the network (processing step 2422) and the processing is finished. Message transmission processing will be described later.

The processing performed when the judgment result at the processing step 2401 indicates the presence of a busy token, i.e., content code, will now be described. In this case, the content code of the received message is compared with a code registered in its content code table (2110 of FIG. 21A) to judge whether the respective codes coincide with each other or not at the processing step 2401. In case of noncoincidence, it is judged whether the SA section of the received message (2303 of FIG. 23B) coincides with its own NCP address or not (processing step 2408). In case of noncoincidence, the received message is stored into the first receiving buffer (processing step 2409) and processing is finished. If the SA coincides with its own NCP address, self-generated message processing 2410, which will be described later in transmission processing, is performed and then the processing is finished. If the received message coincides with the code stored in the content code table at the processing step 2401, a processing described hereafter is performed and the received message is sent to its own connection processing unit. First of all, it is judged in the same way as the above described processing step 2408 whether the SA section of the received message coincides with its own NCP address or not (processing step 2402). In case of coincidence, self-generated message processing 2410 is performed and the processing is finished. In case of noncoincidence, it is first detected on the basis of the second receiving buffer administering flag (2106 of FIG. 21A) whether the second receiving buffer is full or not (processing step 2403). If the second receiving buffer is full, the received message cannot be taken in its own NCP, and hence the switch 3013 included in the interface as shown in FIG. 21B is changed over to the transmitting side (processing step 2412) to prevent the received message from being sent out to the network. Also, the received message is stored into the first receiving buffer (2104 of FIG. 21A) (processing step 2413). Upon completion of storage, it is judged on the basis of the busy flag (2113 of FIG. 21A) whether its own NCP is in the free token acquisition state or not (processing step 2414). If its own NCP is not in the token acquisition state, the switch 3013 included in the interface is changed over to the receiving side (processing step 2415) and the processing is finished. If the second receiving buffer is not full at the processing step 2403, the received message is stored in the second receiving buffer (processing step 2404). By using the FCS data included in the message, it is then checked whether an error such as bit disguise is present in the received message or not (processing step 2405). If no error is present, it is checked whether the reception is a rereception of a message resulting from retransmission of a previously received message or not (processing step 2406). If the reception is not a rereception, the received message is sent to its own NCP connection processing unit (processing step 2407), and the processing is finished. Unless the result of the error check at the processing step 2405 or the rereception check at the processing step 2406 is OK, the message received this time and stored in the second receiving buffer (2105 of FIG. 21A) is erased (processing step 2411), and the processing is finished. The processing contents of the rereception check at the processing step 2406 and the sending of the received message to its own connection processing unit at the processing step 2407 will now be described by referring to FIGS. 24B and 24C, respectively.

Figure 24B:
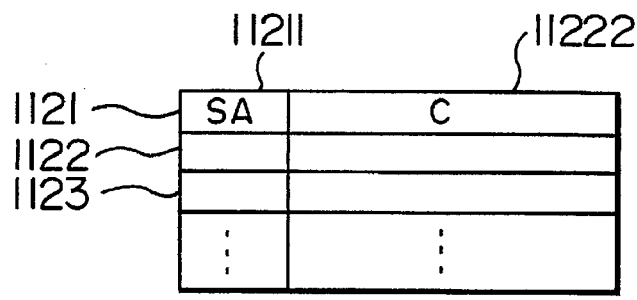

FIG. 24B shows the contents of the received message serial number table 2112 shown in FIG. 21A. This table comprises areas 11211 and 11222 for storing the contents of the SA section (2303 of FIG. 23A) of the received message and contents of a predetermined number of C sections (2304 of FIG. 23A) so as to be associated with values of the SA section. If values of the SA section and C section within the received message are already stored in the present table, the message is a rereceived message. Otherwise, it is a newly received message. In case of a newly received message, the contents of its SA section and C section are added to the present table.

Figure 24C:
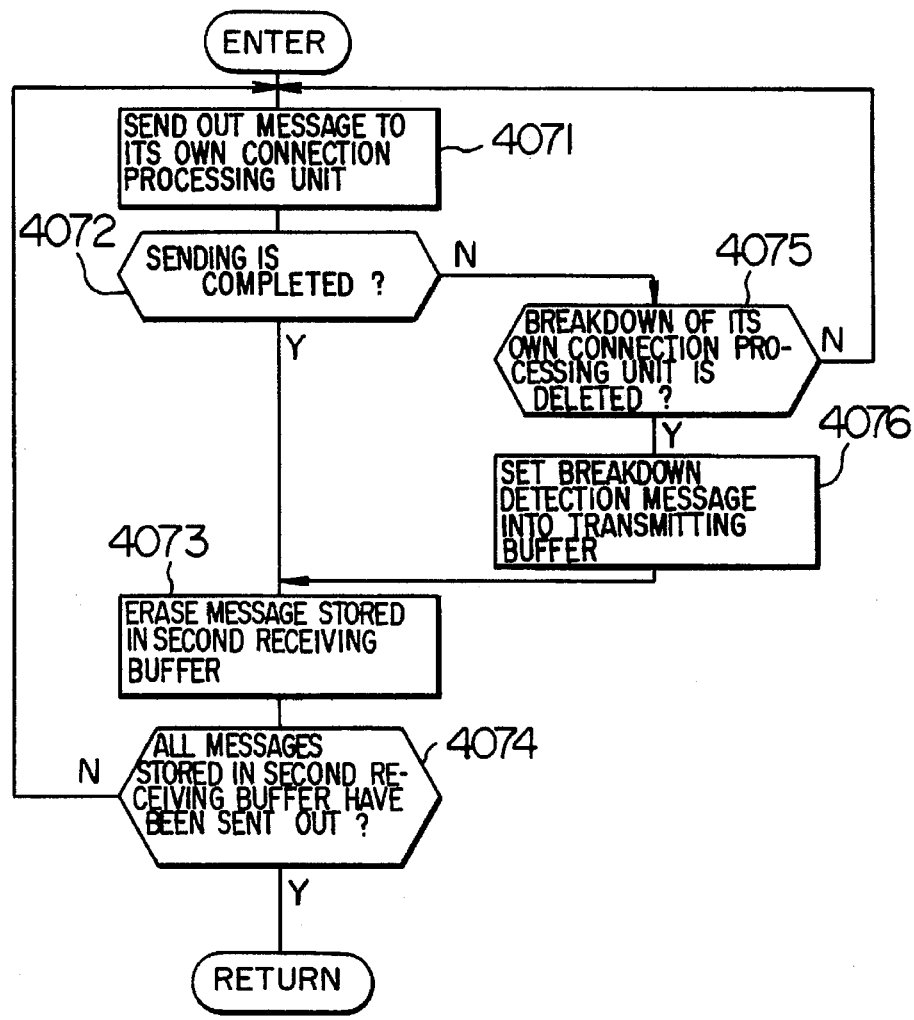

FIG. 24C is a flow chart showing the processing contents of sending of the received message to its own connection processing unit shown in FIG. 24A. First of all, the received message stored in the second receiving buffer (2105 of FIG. 21A) is sent out to its own NCP connection processing unit via the interface 2103 shown in FIG. 21A (processing step 4071). If sending has been normally completed (processing step 4072), the message sent out this time and stored in the second receiving buffer is erased (processing step 4073). Further, it is detected whether a message is stored in the second receiving buffer or not (processing step 4074). If a message is stored, the processing returns to the step 4071. If breakdown of its own connection processing unit is detected (processing step 4075), a breakdown detection message is set into the transmitting buffer (2107 of FIG. 21A) (processing step 4076) and processing proceeds to the step 4073. As a result of processing heretofore described, the receiving buffer of the transmission control unit is prevented from becoming full when the processing unit breaks down, and messages on the network are prevented from being erased.

Figure 25A:
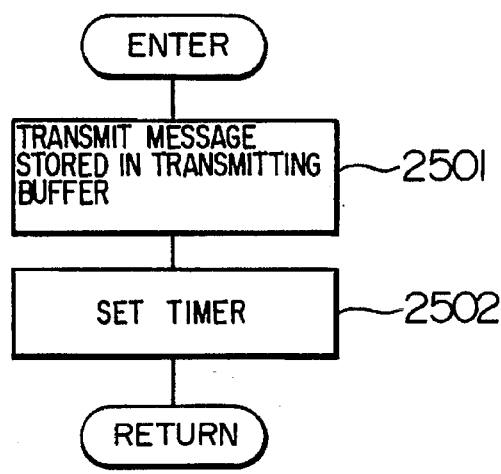
FIGS. 25A and 25B are flow charts for explaining the transmission processing.
Figure 25B:
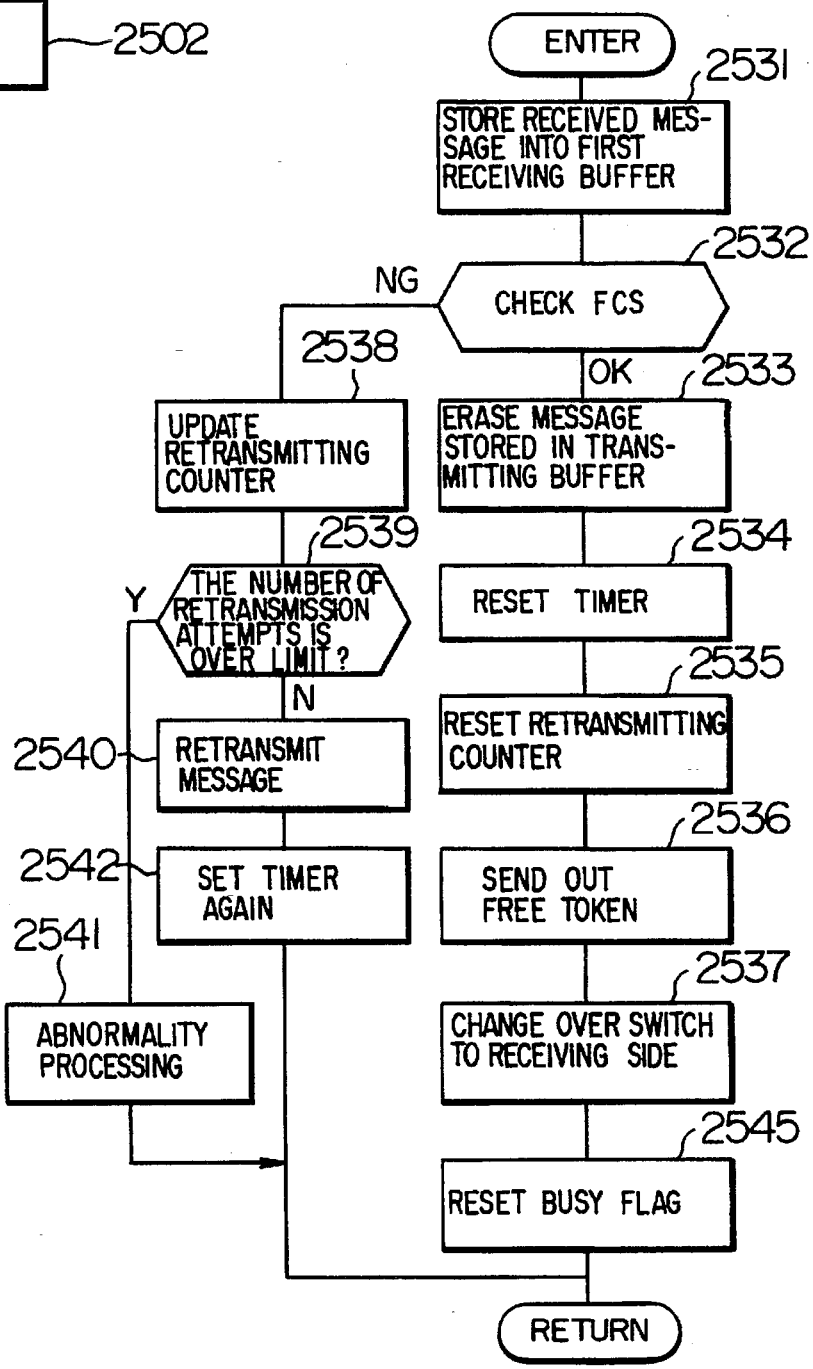

Processing of message transmission to the network will now be described by referring to FIGS. 25A and 25B. In the token passing scheme, the message transmission is performed when the free token has been acquired. That is to say, the message transmission is performed at the transmission processing step 2422 in the receiving flow chart shown in FIG. 24A. FIG. 25A is a flow chart showing the contents of the processing step 2422 of FIG. 24A. First of all, the message stored in the transmitting buffer (2107 of FIG. 21A) is sent out to the transmission path 2001 via the interface 2101 of FIG. 21A (processing step 2501). The timer (2109 of FIG. 21A) is then set (processing step 2502). Owing to the processing heretofore described, the message sent to the network travels around the network and returns to the origin of generation NCP. Its own self-generated message thus returned is processed at self-generated message processing step 2410 included in the flow chart of receiving processing shown in FIG. 24A. FIG. 25B is a flow chart of the self-generated message processing. First of all, the received message is stored into the first receiving buffer (2104 of FIG. 21A) (processing step 2531). By using the FCS data included in the received message, it is then checked whether an error such as bit disguise is present in the received message or not (processing step 2532). If no error is present, the message sending has been normally completed, and hence the message sent out this time and stored in the transmitting buffer (2107 of FIG. 21A) is erased (processing step 2533), and the timer which has been set at the time of message sending as shown in FIG. 25A is reset (processing step 2534). Further, the retransmitting counter (2111 of FIG. 21A) is reset (processing step 2535). After a free token message is generated and sent out to the network (processing step 2536), the switch 3013 in the interface (2101 of FIG. 21A) is changed over to the receiving side (processing step 2537). Lastly, the busy flag (2113 of FIG. 21A) is reset (processing step 2545). If an error is detected at the FCS judgment processing step 2532, this means that message sending has failed and retransmitting processing of processing steps 2538 to 2542 is performed. First of all, the retransmitting counter (2111 of FIG. 21A) is increased by one (processing step 2538). It is then judged whether the value of the retransmitting counter is larger than a predetermined upper limit of retransmission attempts (processing step 2539). If the upper limit is not exceeded, the message to be transmitted this time stored in the transmitting buffer is sent out to the network again (processing step 2540), and the timer is set again (processing step 2542). If the value of the retransmitting counter exceeds the upper limit, the message cannot be transmitted to the network, and abnormality processing 2541 is performed. Abnormality processing is processing comprising logging messages which cannot be transmitted, sending out a free token message, and abandoning the right of transmission, for example. In a double ring configuration having an alternate circuit configuration abnormality processing comprises forming an alternate circuit, for example.

In case time out of a timer set when a message is sent to the network is detected as well, it is determined that message sending has failed, and the same processing as retransmitting processing described by referring to processing steps 2538 to 2542 of FIG. 25B is performed.

In content code communication on a ring-shaped network using the token passing scheme, even if an NCP which could not receive a message because its own receiving buffer is full, for example, is present, that message is automatically retransmitted in the present invention scheme as heretofore described and hence message missing can be prevented.

Figure 26A:
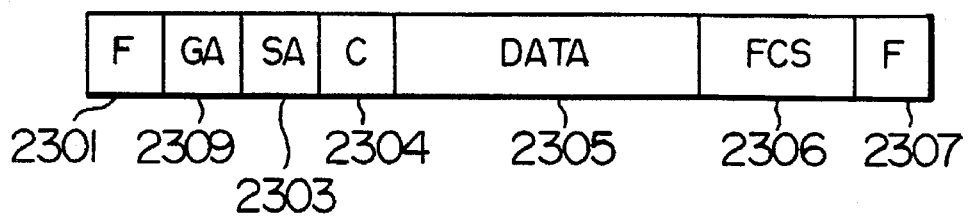
FIGS. 26A and 26B are diagrams for explaining a ninth embodiment.
Figure 26B:
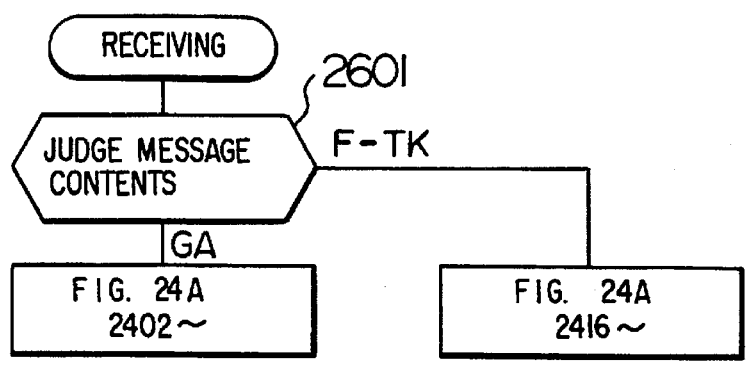

In the present embodiment, only the case of content code communication has been described. Even in broadcast communication, however, the present invention scheme can be applied. As a ninth embodiment, processing in the case of broadcast communication will hereafter be described. As shown in FIG. 26A, a global address (GA 2309) which is an address all NCPs should receive is first set into the CC section 2308 of the busy token message shown in FIG. 23B. Subsequently, at the message content judging processing step 2401 in the processing flow shown in FIG. 24A, it is judged whether the message content is a global address or a free token (processing step 2601 of FIG. 26B). In the case of a global address, processing of the processing step 2402 and succeeding steps of FIG. 24A is performed. In the case of a free token, processing of the processing step 2416 and succeeding steps of FIG. 24A is performed. As a matter of course, a message format having an area for token identification and an area for global address setting, respectively, may be separately provided.

Figure 27:
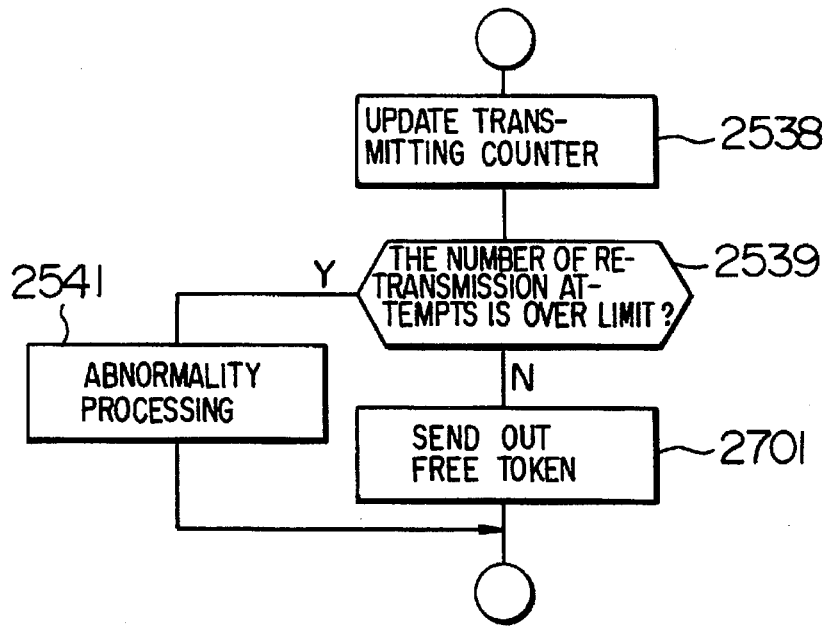
FIG. 27 is a flow chart for explaining a tenth embodiment.

In the above described embodiment, an NCP which has acquired a free token does not release the right of transmission until the message it has generated by itself prevails among all NCPs (i.e., retransmission of the message generated by itself is performed continuously). Even if retransmission of the message generated by itself is required, however, it is also possible to abandon the right of transmission first by sending out the free token and than sending out the message to be retransmitted when the next free token is acquired. The processing in this case will now be described as a tenth embodiment. This processing can be achieved by using processing as shown in FIG. 27 instead of retransmitting processing shown in processing steps 2538 to 2542 of FIG. 25B. That is to say, this processing can be achieved by replacing the processing steps 2540 and 2542 of FIG. 25B with processing step 2701 of sending out a free token message as shown in FIG. 27.

Figure 28:
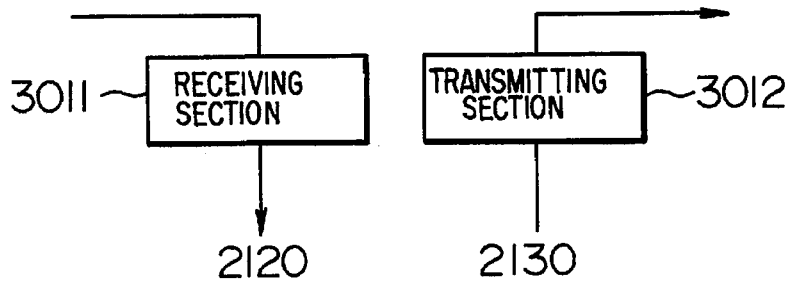
FIG. 28 is a diagram for explaining an eleventh embodiment.

In the above described embodiment, the interface 2101 shown in FIG. 21A is so configured that the message received from the network is outputted to the network as it is. However, it is also possible to adopt a "store and forward scheme" in which the message received from the network is taken into its own NCP first and then sent to the network. Processing in this case will hereafter be described as an eleventh embodiment. In this case, the interface 2101 is configured as shown in FIG. 28. The switch 3013 and the line 2140 are removed. Its processing can be achieved by applying the following amendments to the processing flow of FIG. 24A.

(1) The changeover operation of the switch 3013 is omitted.

(2) After the processing step 2404, the processing of sending the message received this time and stored in the second receiving buffer is added.

Figure 29A:
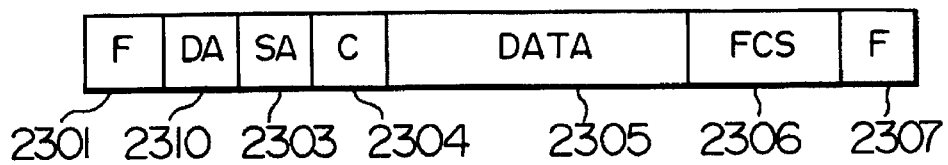
FIGS. 29A and 29B are diagrams for explaining a twelfth embodiment.
Figure 29B:
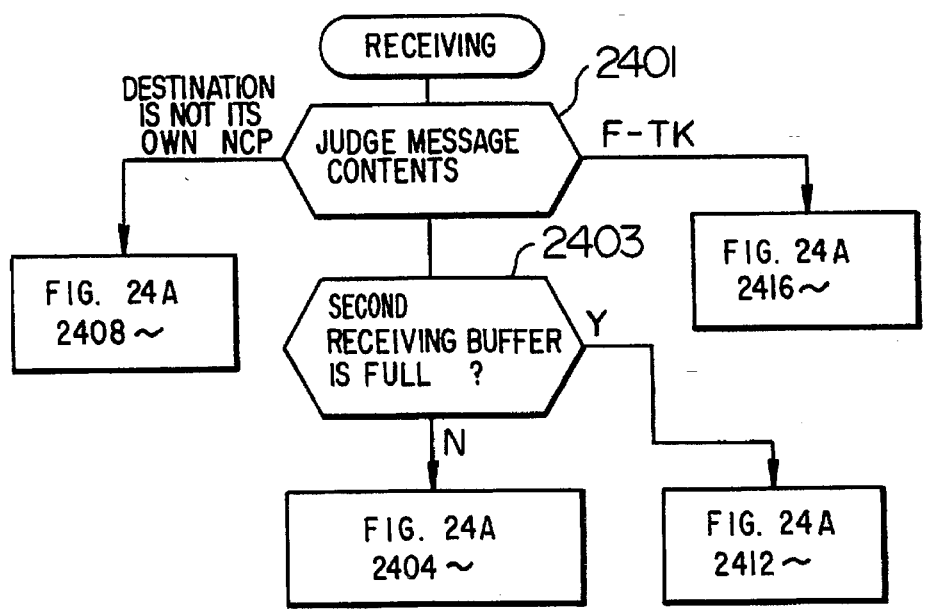

Lastly, the object of all of the above described embodiments is broadcast or content code communication. However, the present invention can be applied to the case of one to one communication messages as well. Processing in this case will here-after be described as a twelfth embodiment. First of all, the receiving NCP address DA (2310 of FIG. 29A) is set into the CC section 2308 of the busy token message shown in FIG. 23B. Thereafter, at the message content judgment processing step 2401 in the processing flow of FIG. 24A, it is judged whether the message is a free token message or a busy token message. Further, in the case of a busy token message, it is judged whether the destination of the message is its own NCP or not (processing step 2401 of FIG. 29B). In case of a message in the destination is its own NCP, the SA judgment processing step 2402 is omitted, and the processing step 2403 of FIG. 24A and succeeding steps are performed. In the case of a message in which the destination is not its own NCP, the processing step 2408 of FIG. 24A and succeeding steps are performed. In the case of a free token message, the processing step 2416 of FIG. 24A and succeeding steps are performed.

When the present scheme is applied to one to one communication, message retransmission can be performed without using an answer message as in the prior art scheme.

In accordance with the present invention, each processor informs other processors of its own data receiving capability as described above, resulting in communication free from data error.

Further, when processing corresponding to the number of data items stored in the receiving buffer is performed, overflow of the receiving buffer can be prevented. Since other processors are informed about the receiving state as occasion demands, processors restrain data transmissions to each other so as to cope with the load state, resulting in communication free from data error.

If loads of all processors on the transmission path are equivalent, each processor is capable of knowing the loads of other processors by monitoring its own load. Even if processors do not inform each other of mutual states therefore, data loss can be prevented by a processor suppressing its own data transmission.

In a network of the bus type, it can be instantly judged whether a message issued by the processor at the transmitting side has been received by other processors, and hence broadcast communication can be surely performed.

Even if content code communication or broadcast communication is performed on a ring-shaped network using the token passing scheme, the NCP which has generated the message can detect the existence of an NCP which could not receive that the message and can retransmit that message. Therefore, reliable content code communication and broadcast communication free from message loss become possible.

Further, the present invention can be applied to the case of one-to-one communication. In this case, an efficient retransmission control scheme which does not need an answer message can be provided.

We claim:

1. A control method for a distributed processor system including a plurality of processors connected via a transmission medium, each processor having data receiving means for receiving data, comprising the steps of:

monitoring, in each processor, the data receiving means therein and judging the receiving capability of said data receiving means;

transmitting to all other processors in said system, from each processor in which a result of said judging indicates an insufficient receiving capability, a message relating to said result of said judging; and performing, in each of said all other processors, an abnormality processing corresponding to said result of said judging.

2. A control method for a distributed processor system according to claim 1, wherein the data receiving means in each processor includes a receiving buffer for storing data received from said transmission medium, and wherein said judging step comprises the step of judging, in each processor, the receiving capability of the data receiving means of the processor by monitoring the number of data items stored in the receiving buffer of said data receiving means.

3. A control method for a distributed processor system according to claim 2, wherein said abnormality processing comprises the step of setting a flag for indicating an abnormal state when the result of the receiving capability judgment indicates that the receiving means has an insufficient receiving capability.

4. A control method for a distributed processor system according to claim 2, wherein said message includes a data transmission delay requesting message for stopping data transmission for a predetermined time.

5. A control method for a distributed processor system including a plurality of processors connected via a transmission medium, each processor having data receiving means for receiving data, comprising the steps of:

monitoring, in each processor, the data receiving means therein and judging the receiving capability of said data receiving means;

transmitting to other processors, from each processor in which a result of said judging indicates an insufficient receiving capability, a message relating to said result of said judging; and performing, in each of said other processors, an abnormality processing corresponding to said result of said judging;

wherein the data receiving means in each processor includes a receiving buffer for storing data received from said transmission medium, and wherein said judging step comprises the step of judging, in each processor, the receiving capability of the data receiving means of the processor by monitoring the number of data items stored in the receiving buffer of said data receiving means; and wherein said message includes a data transmission delay requesting message for stopping data transmission for a predetermined time;

further comprising, in each of said other processors, the steps of:

receiving said data transmission delay requesting message;

storing in a buffer, in each processor receiving said data transmission delay requesting message, data to be transmitted via the transmission medium; and transmitting said data stored in said buffer upon elapse of a predetermined time period following reception of said data transmission delay requesting message.

6. A control method for a distributed processor system according to claim 5, wherein the length of said predetermined time period is changed according to how frequently the data transmission delay requesting message is received.

7. A control method for a distributed processor system according to claim 4, wherein said abnormality processing comprises the step of repetitively transmitting a first message at predetermined time intervals after transmission of said transmission delay requesting message and transmitting a delay cancel message when the load on said data receiving means falls below a predetermined value.

8. A control method for a distributed processor system according to claim 7, further comprising the steps of temporarily stopping data transmission in a processor which receives a data transmission delay requesting data transmission from the processor which has temporarily stopped data transmission upon receiving a delay cancel message.

9. A control method for a distributed processor system according to claim 8, wherein said abnormality processing further comprises the step of restarting data transmission in the processor when data transmission has been stopped in response to receipt of a data transmission delay requesting message from another processor under the condition that the processor does not receive a second data transmission delay requesting message for a predetermined time or longer.

10. A control method for a distributed processor system according to claim 7, wherein said abnormality processing further comprises the step of restarting data transmission in the processor when data transmission has been stopped in response to receipt of a data transmission delay requesting message from another processor under the condition that the processor does not receive a second data transmission delay requesting message for a predetermined time or longer.

11. A control method for a distributed processor system according to claim 1, wherein said message includes a data transmission delay requesting message for stopping data transmission for a predetermined time.

12. A control method for a distributed processor system including a plurality of processors connected via a transmission medium, each processor having data receiving means for receiving data, comprising the steps of:

monitoring, in each processor, the data receiving means therein and judging the receiving capability of said data receiving means;

transmitting to other processors, from each processor in which a result of said judging indicates an insufficient receiving capability, a message relating to said result of said judging; and performing, in each of said other processors, an abnormality processing corresponding to said result of said judging;

wherein said message includes a data transmission delay requesting message for stopping data transmission for a predetermined time;

further comprising, in each of said other processors, the steps of:

receiving said data transmission delay requesting message;

storing in a buffer, in each processor receiving said data transmission delay requesting message, data to be transmitted via the transmission medium; and transmitting said data stored in said buffer upon elapse of a predetermined time period following reception of said data transmission delay requesting message.

13. A control method for a distributed processor system according to claim 12, wherein the length of said predetermined time period is changed according to how frequently the data transmission delay requesting message is received.

14. A control method for a distributed processor system according to claim 11, wherein said abnormality processing comprises the step of repetitively transmitting a first message at predetermine time intervals after transmission of said transmission delay requesting message and transmitting a delay cancel message when the load on said data receiving means falls below a predetermined value.

15. A control method for a distributed processor system according to claim 14, further comprising the steps of temporarily stopping data transmission in a processor which receives a data transmission delay requesting message from another processor and restarting data transmission from the processor which has temporarily stopped data transmission upon receiving a delay cancel message.

16. A control method for a distributed processor system according to claim 15, wherein said abnormality processing further comprises the step of restarting data transmission in the processor when data transmission has been stopped in response to receipt of a data transmission delay requesting message from another processor under the condition that the processor does not receive a second data transmission delay requesting message for a predetermined time or longer.

17. A control method for a distributed processor system according to claim 14, wherein said abnormality processing further comprises the step of restarting data transmission in the processor when data transmission has been stopped in response to receipt of a data transmission delay requesting message from another processor under the condition that the processor does not receive a second data transmission delay requesting message for a predetermined time or longer.

18. A control method for a distributed processor system including a plurality of processors connected via a transmission medium, each processor having data receiving means for receiving data from each of all other processors in said system regardless of whether said data is intended for said each processor, comprising the steps of:

monitoring, in each processor, the data receiving means therein and judging the receiving capability of said data receiving means; and performing an abnormality processing in each processor in which a result of said judging indicates an insufficient receiving capability;

wherein said abnormality processing comprises the step of stopping data transmission to each of said all other processors for a predetermined period of time when the result of the receiving capability judgment indicates that the data receiving means has an insufficient receiving capability.

19. A control method for a distributed processor system according to claim 18, wherein said abnormality processing further comprises the step of setting a flag for indicating an abnormal state when the result of the receiving capability judgment indicates that the receiving means has an insufficient receiving capability.

20. A control method for a distributed processor system according to claim 18, wherein the data receiving means in each processor includes a receiving buffer for storing data received from said transmission medium, and wherein said judging step comprises the step of judging, in each processor, the receiving capability of the data receiving means of the processor by monitoring the number of data items stored in the receiving buffer of said data receiving means.

21. A transmission method for a distributed processor system according to claim 20, further comprising the step of:

detecting, in the another processor, a collision between said busy signal and the message transmitted by the another processor.

22. A transmission method for a distributed processor system according to claim 21, further comprising the step of:

retransmtting, in the another processor, the message transmitted by the another processor at predetermined time intervals until no collision is detected.

23. In a distributed processor system including a plurality of processors connected via a transmission medium, each processor having a data transmitting and receiving apparatus comprising:

a receiving buffer for storing therein data items received from said transmission medium;

received data monitoring means for monitoring the number of data items stored in said receiving buffer, for comparing the number of data items stored in said receiving buffer with a predetermined number, and for detecting when the number of data items stored in said receiving buffer exceeds said predetermined number;

message sending means for transmitting a transmission delay requesting message to said transmission medium for transmission to each of all other processors in said system when said received data monitoring means detects that the number of data items stored in said receiving buffer exceeds said predetermined number;

data receiving means for receiving data items, including a transmission delay requesting message transmitted by one of the other processors, from said transmission medium and for storing said data items in said receiving buffer;

a transmitting buffer for storing therein data to be transmitted to said transmission medium; and data transmitting means for transmitting data items stored in said transmitting buffer to the transmission medium, said data transmitting means controlling data item transmission in response to said transmission delay requesting message received by said data receiving means from said transmission medium.

24. A transmission method for a distributed processor system including a plurality of processors connected via a bus type network, said transmission method comprising the steps of:

judging, in each processor, whether the processor is ready to receive a message from said bus type network; and sending, in each processor which is not ready to receive the message, a busy signal to each of all other processors in said system in response to a result of said judging until the processor is ready to receive the message.

25. A transmission method for a distributed processor system according to claim 24, wherein another processor, which transmits a message and which has detected a collision between the message transmitted by the another processor and said busy signal, retransmits the message transmitted by the another processor at predetermined time intervals until no collision is detected.

26. A transmission method for a distributed processor system according to claim 24, further comprising the step of:

detecting, in each processor which is not ready to receive the message, a message transmitted over said bus type network by another processor;

wherein the sending step is performed when the message transmitted over said bus type network by another processor is detected in the detecting step.

* * * * *